(12) United States Patent
Sun et al.

(10) Patent No.: US 12,736,795 B2
(45) Date of Patent: Sep. 15, 2026

(54) SYSTEMS AND METHODS FOR DETECTION AND 3D IMAGING OF CELL JUNCTIONS OF BLASTOCYSTS AND OTHER BIOLOGICAL STRUCTURES

(71) Applicant: Suzhou Boundless Medical Technology Co., Ltd., Suzhou (CN)

(72) Inventors: Yu Sun, Toronto (CA); Guanqiao Shan, Toronto (CA); Changsheng Dai, Toronto (CA); Zhuoran Zhang, Toronto (CA)

(73) Assignee: Suzhou Boundless Medical Technology Co., Ltd., Suzhou (CN)

( * ) Notice: Subject to any disclaimer, the term of this patent is extended or adjusted under 35 U.S.C. 154(b) by 235 days.

(21) Appl. No.: 18/557,485

(22) PCT Filed: Apr. 27, 2022

(86) PCT No.: PCT/CA2022/050642

§ 371 (c)(1),
(2) Date: Oct. 26, 2023

(87) PCT Pub. No.: WO2022/226647

PCT Pub. Date: Nov. 3, 2022

(65) Prior Publication Data

US 2024/0219706 A1 Jul. 4, 2024

Related U.S. Application Data

(60) Provisional application No. 63/180,174, filed on Apr. 27, 2021.

(51) Int. Cl.
*G01N 15/1429* (2024.01)
*G01N 15/1434* (2024.01)
(Continued)

(52) U.S. Cl.
CPC ....... *G02B 21/367* (2013.01); *G01N 15/1429* (2013.01); *G02B 30/54* (2020.01); *G01N 2015/1445* (2013.01)

(58) Field of Classification Search
CPC ...... G02B 21/367; G02B 30/54; G02B 21/14; G01N 15/1429; G01N 2015/1445;
(Continued)

(56) References Cited

U.S. PATENT DOCUMENTS 11,055,910 B1 * 7/2021 Deng .................. G06V 20/647
2008/0064099 A1 3/2008 Parikh et al.
(Continued)

OTHER PUBLICATIONS

International Search Report and Written Opinion for International Application No. PCT/CA2022/050642, mailed Aug. 4, 2022.

*Primary Examiner* — Iriana Cruz
(74) *Attorney, Agent, or Firm* — SZDC Law PC

(57) ABSTRACT

Systems and methods for detecting and 3D imaging of cell junctions on a cell layer of a biological structure, such as a blastocyst, are provided. The method can include operating a microscope to view a portion of the biological structure; rotating the biological structure through a set of orientations; capturing, at each orientation, a respective image of a corresponding one of a set of cell layer regions of the cell layer, wherein each cell layer region partly overlaps with at least another cell layer region, thereby obtaining a set of partially overlapping cell layer images; creating a cell layer texture map containing cell junction information from the set of cell layer images; and constructing a 3D image of the cell junctions based on the cell layer texture map and the cell junction information contained therein.

8 Claims, 16 Drawing Sheets

(51) Int. Cl.
*G02B 21/36* (2006.01)
*G02B 30/54* (2020.01)

(58) Field of Classification Search
CPC ....... G01N 2015/1452; G01N 15/1425; G01N 15/1433; G01N 15/1434; G01N 33/5005; G01N 2015/1006
See application file for complete search history.

(56) References Cited

U.S. PATENT DOCUMENTS

| | | | | |
|---|---|---|---|---|
| 2010/0265251 | A1* | 10/2010 | Vining | G06T 7/11<br>345/420 |
| 2016/0125638 | A1* | 5/2016 | Grimaud | G06T 3/4038<br>348/169 |
| 2016/0355781 | A1 | 12/2016 | Perez | |
| 2021/0032588 | A1* | 2/2021 | Masaeli | B01L 3/502761 |
| 2021/0056704 | A1* | 2/2021 | Kuromi | G01N 15/1429 |
| 2021/0264687 | A1* | 8/2021 | Lei | G06T 7/564 |

* cited by examiner out-of-plane rotation
222
pushing
y
x
z
200
202
300
lens front view
z
x
y
204
202
210
206
300 pushing
200
204
202
210
206
300

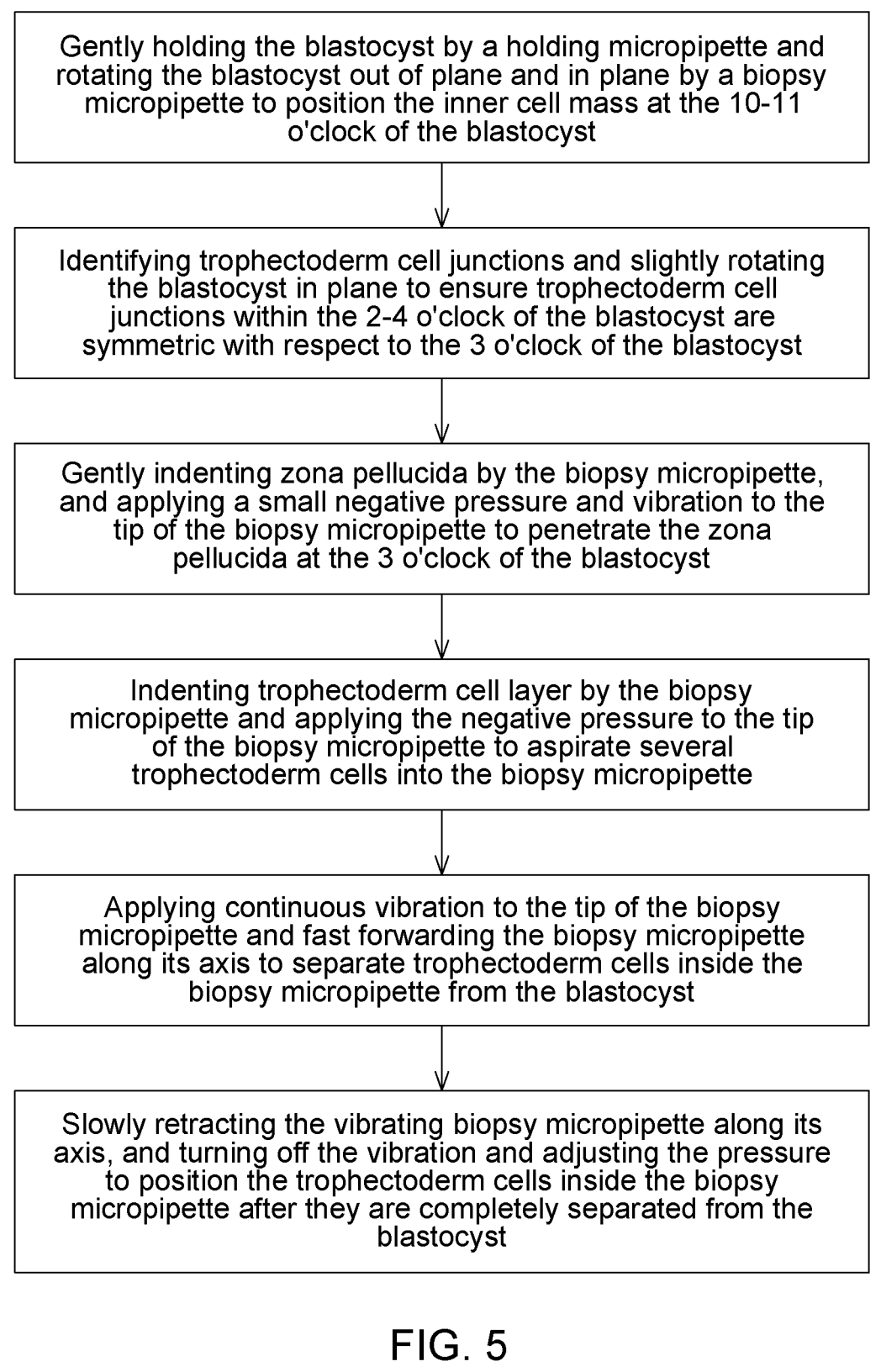

Gently holding the blastocyst by a holding micropipette and rotating the blastocyst out of plane and in plane by a biopsy micropipette to position the inner cell mass at the 10-11 o'clock of the blastocyst

↓

Identifying trophectoderm cell junctions and slightly rotating the blastocyst in plane to ensure trophectoderm cell junctions within the 2-4 o'clock of the blastocyst are symmetric with respect to the 3 o'clock of the blastocyst

↓

Gently indenting zona pellucida by the biopsy micropipette, and applying a small negative pressure and vibration to the tip of the biopsy micropipette to penetrate the zona pellucida at the 3 o'clock of the blastocyst

↓

Indenting trophectoderm cell layer by the biopsy micropipette and applying the negative pressure to the tip of the biopsy micropipette to aspirate several trophectoderm cells into the biopsy micropipette

↓

Applying continuous vibration to the tip of the biopsy micropipette and fast forwarding the biopsy micropipette along its axis to separate trophectoderm cells inside the biopsy micropipette from the blastocyst

↓

Slowly retracting the vibrating biopsy micropipette along its axis, and turning off the vibration and adjusting the pressure to position the trophectoderm cells inside the biopsy micropipette after they are completely separated from the blastocyst

FIG. 5

SYSTEMS AND METHODS FOR DETECTION AND 3D IMAGING OF CELL JUNCTIONS OF BLASTOCYSTS AND OTHER BIOLOGICAL STRUCTURES

This application is the U.S. National Stage of International Application No. PCT/CA2022/050642, filed Apr. 27, 2022, which designates the U.S., published in English, and claims the benefit of U.S. Provisional Application No. 63/180,174, filed Apr. 27, 2021. The entire teachings of the above applications are incorporated herein by reference.

TECHNICAL FIELD

The technical field generally relates to techniques for imaging biological structures. In particular, the technical field relates to techniques for performing detection and three-dimensional image construction of cell junctions in biological structures, such as blastocysts and other transparent/translucent structures.

BACKGROUND

Retrieving or collecting cells from a preimplantation stage embryo is an important step for preimplantation genetic testing (PGT) in in vitro fertilization (IVF). PGT can be categorized according to two categories: preimplantation genetic screening (PGS) and preimplantation genetic diagnosis (PGD). PGS refers to techniques where embryos from presumed chromosomally normal genetic parents are screened for aneuploidy. PGD refers to when one or both genetic parents have a known genetic abnormality and testing is performed on an embryo to determine if the embryo carries a genetic abnormality.

Biopsies for PGT can be done at three different embryo development stages. For instance, polar body biopsy from an oocyte or zygote can be performed on Day 0 or Day 1 after fertilization; cleavage-stage embryo biopsy can be performed on Day 3 after fertilization; and blastocyst biopsy can be performed on Day 5 or Day 6 after fertilization.

Since polar bodies originate from the meiosis of oocytes, polar body biopsy is limited to testing maternal genetic materials only. Cleavage-stage embryo biopsy enables testing genetic information from both parents. However, removing one or two out of eight blastomeres from cleavage-stage embryos can undesirably impair embryo development and implantation potential. In contrast, blastocyst biopsy, which removes several trophectoderm cells from a blastocyst, is a technique that induces less impact on embryo reproductive potential and provides more cells for genetic analysis, thereby increasing the sensitivity and reliability of subsequent genetic testing. As such, blastocyst biopsy on Day 5 or Day 6 after fertilization is a technique that is widely used for PGT in IVF clinics.

A blastocyst is a biological structure formed in the early development of mammals. A blastocyst contains a fist-shaped cluster of cells that is referred to as the inner cell mass (ICM), which eventually develops into a fetus. The blastocyst also contains a monolayer of trophectoderm cells (TE cells). The TE cells form a spherical cavity that eventually develops into the placenta. The blastocyst is protected by a glycoprotein layer called the zona pellucida (ZP). During blastocyst biopsy, the ICM generally remains untouched to avoid damage to fetal development, and an empirically estimated number of TE cells are separated from the TE monolayer and collected for performing subsequent genetic testing.

The number of collected intact TE cells influences the embryo reproductive potential and the genetic testing accuracy. As the number of collected TE cells increases, more genetic materials are available for performing genetic testing, which leads to a higher signal-to-noise ratio (SNR) and thus can improve the genetic testing accuracy. However, separating a large number of TE cells from the embryo can also increase damages to the embryo, and can reduce the implantation and pregnancy rate. For example, for a human blastocyst biopsy, it can be recommended to collect between 5 and 8 TE cells to enable performing various genetic testing methods, such as fluorescence in situ hybridization (FISH), array comparative genomic hybridization (aCGH) and quantitative polymerase chain reaction (qPCR), while balancing embryonic reproductive potential and genetic testing accuracy.

The intactness of collected TE cells is another factor that can affect genetic testing results. An intact TE cell is a TE cell that maintains the integrity of cell membrane with the function of selective permeability. The genetic materials of an intact TE cell are protected and confined by the cell membrane during TE cell transfer for genetic testing. During cell transfer, the TE cells are generally washed in a washing buffer several times to avoid genetic contamination. If collected TE cells have a ruptured cell membrane, such TE cells can lose part of or their entire genetic materials during the washing process, which is undesirable. The SNR can also decrease, and errors can occur if the genetic materials of some collected TE cells are lost during the washing process, which can reduce the genetic testing accuracy.

Techniques known in the art for performing blastocyst biopsy generally include two classes of methods. According to the first class of methods, an opening having a diameter ranging from 5 μm to 10 μm is created in the ZP of a cleavage-stage embryo on Day 3 after fertilization using one or two laser pulses, which can be referred to as assisted hatching, followed by extended culture to the blastocyst stage. On Day 5 or Day 6, the blastocyst is held by a holding micropipette and TE cells herniated from, i.e., extruded out of, the blastocyst cavity through the artificially created opening in the ZP are aspirated into a biopsy micropipette and separated from the blastocyst using laser pulses. Drawbacks associated with this method include the need for additional manipulations given the assisted hatching on Day 3, and the risk for ICM herniation, which may also require additional manipulation of the blastocyst and affect its development.

According to the second class of methods, the assisted hatching can be omitted, and the embryo can be cultured up to the blastocyst stage. On Day 5 or Day 6, the blastocyst is held by a holding micropipette and the ICM is positioned at a given position within the blastocyst, e.g., at the 6 o'clock, 9 o'clock, or 12 o'clock position. A 10-μm to 20-μm breach is created in the ZP at the 2-3 o'clock position by laser pulses or by a mechanical force, such as by a micropipette vibration generated by a piezoelectric actuator. A biopsy micropipette is then used to press against the ZP repeatedly to release the TE cells from the internal surface of the ZP. Once the TE cell layer is detached from the ZP, the biopsy micropipette is inserted through the breach in the ZP to reach the TE cells. An empirically estimated or an undefined number of TE cells is then aspirated into the biopsy micropipette and separated from the blastocyst by laser pulses or by mechanical force. Thus, according to the second class of methods, a repeated application of pressure against the ZP of the blastocyst is required to release the TE cells and aspirate the TE cells into the biopsy micropipette for separation. The repeated pressing process by the biopsy micropipette may undesirably apply a large mechanical force/stress to the ICM over a long period of time, posing potential damage to fetal development. Furthermore, this type of biopsy protocol can result in a long exposure time of blastocysts outside the incubator, e.g., 2 to 5 minutes, thereby exerting environmental stress on embryos and possibly reducing their reproductive potential.

The number of collected intact TE cells is an important component of a blastocyst biopsy, and affects the embryo reproductive potential and the genetic testing accuracy. However, to date, the number of the collected intact TE cells and the total cell volume aspirated into the biopsy micropipette is estimated empirically by embryologists. Since TE cells vary in volume among different blastocysts and even within the same blastocyst, the number of the intact TE cells collected by controlling the total cell volume can lead to large deviations from the pre-defined/desired number of TE cells.

Therefore, there remain various challenges with respect to controlling the number of TE cells being collected in the context of blastocyst biopsies.

SUMMARY

In accordance with an aspect, there is provided a method for detecting and 3D imaging of cell junctions on a cell layer of a biological structure, the method comprising:

- rotating the biological structure through a set of orientations;
- capturing, at each orientation, a respective image of a corresponding one of a set of cell layer regions of the cell layer, wherein each cell layer region partly overlaps with at least another cell layer region, thereby obtaining a set of partially overlapping cell layer images;
- creating a cell layer texture map containing cell junction information from the set of cell layer images; and
- constructing a 3D image of the cell junctions based on the cell layer texture map and the cell junction information contained therein.

In some implementations, creating the cell layer texture map comprises detecting the cell junction information from the set of cell layer images, and performing an image matching and stitching operation based on the set of cell layer images to create the cell layer texture map, wherein the cell layer texture map incorporates therein the cell junction information detected from the set of cell layer.

In some implementations, creating the cell layer texture map comprises performing an image matching and stitching operation based on the set of cell layer images to create the cell layer texture map, and detecting the cell junction information from the cell layer texture map.

In some implementations, the method further comprises pre-processing the set of partially overlapping cell layer images prior to performing the image matching and stitching operation.

In some implementations, pre-processing the set of partially overlapping cell layer images comprises performing an intensity inhomogeneity correction operation configured to reduce an intensity inhomogeneity effect in the set of partially overlapping cell layer images.

In some implementations, pre-processing the set of partially overlapping cell layer images comprises performing a blur detection operation to detect and remove blurred areas in the cell layer images.

In some implementations, pre-processing the set of partially overlapping cell layer images comprises:

- obtaining a group of simulated 2D images for at least one cell layer image of the set of partially overlapping cell layer images; and
- performing the image matching and stitching operation using the group of simulated 2D images.

In some implementations, obtaining the group of simulated 2D images comprises:

- projecting the at least one cell layer image onto a virtual spherical surface;
- rotating the at least one cell layer image three-dimensionally along the virtual spherical surface to obtain a group of 3D images; and
- projecting the group 3D images back to 2D images to produce the group of simulated 2D cell layer images.

In some implementations, rotating the at least one cell layer image three-dimensionally comprises rotating the at least one cell layer image by an angular interval ranging from about 5° to about 45° about each of two orthogonal axes.

In some implementations, the at least one cell layer image is rotated by a step angle ranging from about 1° to about 5° between obtaining successive ones of the 3D images.

In some implementations, the biological structure is transparent or translucent.

In some implementations, the method further comprises capturing the set of cell layer images with a depth of field that is less than a radius of the biological structure.

In some implementations, the method further comprises setting the depth of field to be less than about 5 micrometers.

In some implementations, the set of cell layer images are captured with a microscope, and the method further comprises adjusting a focal plane of the microscope prior to said capturing.

In some implementations, adjusting the focal plane of the microscope comprises positioning the focal plane of the microscope to view a portion of the biological structure that is closest to the objective.

In some implementations, constructing the 3D image of the cell junctions comprises projecting the cell junction information onto a 3D model representation of an outer surface of the biological structure.

In some implementations, the method further comprises determining the 3D model representation of the outer surface of the biological structure based on previously acquired image data of the biological structure.

In some implementations, determining the 3D model representation of the outer surface of the biological structure comprises:

- capturing an image of the biological structure;
- determining, as the previously acquired image data, a radius and a position of a center of the biological structure in the captured image; and
- modeling, based on the previously acquired image data, the 3D model representation of the outer surface of the biological structure.

In some implementations, the outer surface of the biological structure is spherical.

In some implementations, detecting the cell junction information comprises identifying bright and dark edges.

In some implementations, detecting the cell junction information comprises manual labeling, semi-automatic edge detection, automatic edge detection, or any combination thereof.

In some implementations, capturing the set of partially overlapping cell layer images comprises using a contrast-enhancing imaging technique.

In some implementations, the contrast-enhancing imaging techniques comprise phase contrast imaging or differential interference contrast (DIC) imaging.

In some implementations, rotating the biological structure through the set of orientations comprises:

rotating the biological structure about a first axis of rotation to cover a first subset of the orientations; and rotating the biological structure about a second axis of rotation to cover a second subset of the orientations, wherein the first axis of rotation and the second axis of rotation are perpendicular to each other.

In some implementations, successive orientations in the first subset are separated by a biological structure rotating angle equal to or less than about 45°.

In some implementations, successive orientations in the second subset are separated by a biological structure rotating angle equal to or less than about 45°.

In some implementations, the orientations in the first subset span a resulting angle equal to about 360°.

In some implementations, the orientations in the second subset span a resulting angle equal to about 360°.

In some implementations, the biological structure is a blastocyst, and the cell junctions are trophectoderm cell junctions.

In accordance with another aspect, there is provided a method for identifying and positioning a predetermined number of trophectoderm (TE) cells of a blastocyst having an inner cell mass within a blastocyst cavity, the method comprising:

modeling TE cell junctions between adjacent ones of the TE cells of the blastocyst three-dimensionally in accordance with the method as defined herein, with the blastocyst corresponding to the biological structure;

positioning the inner cell mass of the blastocyst between a ten o'clock position and an eleven o'clock position or between a seven o'clock position and an eight o'clock position of the blastocyst; and positioning the predetermined number of TE cells at least partially within an area defined by an orifice of a biopsy micropipette having a longitudinal axis aligned with a three o'clock position of the blastocyst.

In some implementations, positioning the predetermined number of TE cells at least partially within the area defined by an orifice of a biopsy micropipette comprises adjusting a positioning of the predetermined number of TE cells such that a surface of the predetermined number of TE cells is substantially entirely within the area defined by the orifice of the biopsy micropipette.

In some implementations, positioning the predetermined number of TE cells at least partially within the area defined by the orifice of the biopsy micropipette comprises rotating the blastocyst.

In some implementations, rotating the blastocyst comprises performing at least one of an out-of-plane rotation and an in-plane rotation with respect to a focal plane of the microscope.

In some implementations, positioning the predetermined number of TE cells at least partially within the area defined by the orifice of the biopsy micropipette comprises applying a negative pressure to the orifice of the biopsy micropipette.

In some implementations, the method further comprises:

penetrating a zona pellucida (ZP) of the blastocyst without causing the blastocyst cavity to collapse; and separating the predetermined number of TE cells from the blastocyst.

In some implementations, separating the predetermined number of TE cells from the blastocyst is performed such that the TE cell layer forms an acute angle relative to the longitudinal axis of the biopsy micropipette.

In some implementations, separating the TE cells from the blastocyst comprises:

advancing the biopsy micropipette along the longitudinal axis of the biopsy micropipette;

driving the biopsy micropipette into vibrations;

retracting the biopsy micropipette from the blastocyst; and adjusting a retaining pressure applied to the orifice of the biopsy micropipette to retain the predetermined number of TE cells that have been separated from the blastocyst inside the biopsy micropipette.

In some implementations, advancing the biopsy micropipette along the longitudinal axis of the biopsy micropipette comprises advancing the biopsy micropipette for a forwarding distance that is more than a radius of the blastocyst and less than a diameter of the blastocyst.

In some implementations, driving the biopsy micropipette into vibrations is performed along the longitudinal axis of the biopsy micropipette.

In some implementations, penetrating the ZP of the blastocyst and separating the predetermined number of TE cells from the blastocyst are automated steps.

In some implementations, the predetermined number of TE cells is identified for performing subsequent separating and collecting of the predetermined number of TE cells.

In accordance with another aspect, there is provided a method for analyzing a predetermined number of TE cells identified according to the method defined herein.

In accordance with another aspect, there is provided a system for detecting and 3D imaging of cell junctions on a cell layer of a biological structure, the system comprising:

a microscope comprising an objective and a camera, the microscope being configured to image the biological structure;

a sample holder and positioner configured to hold and position the biological structure relative to the objective of the microscope; and a control and processing unit comprising a processor and a control device having a processor and memory storing instructions executable by the processor for:

operating the microscope to view a portion of the biological structure;

operating the microscope and the sample holder and positioner to perform an image capture operation comprising:

rotating the biological structure through a set of orientations with the sample holder and positioner, wherein each orientation corresponds to a different region of the cell layer being viewed, and wherein each cell layer region overlaps partly with at least another cell layer region; and capturing, at each orientation, a respective image of the corresponding cell layer region with the camera, thereby obtaining a set of partially overlapping cell layer images;

processing the set of partially overlapping cell layer images to create a cell layer texture map containing cell junction information; and processing the cell layer texture map and the cell junction information contained therein to construct a 3D image of the cell junctions.

In some implementations, the system further comprises an automated piezo-driven apparatus for collecting a predetermined number of cells from the biological structure, the predetermined number of cells being obtainable based on the 3D image construction of the cell junctions.

In accordance with another aspect, there is provided a method for blastocyst biopsy, the method comprising:

- detecting trophectoderm cell junctions of the blastocyst three-dimensionally;
- orienting and positioning inner cell mass and trophectoderm cells of the blastocyst;
- penetrating zona pellucida without causing the cavity of the blastocyst to collapse; and
- separating trophectoderm cells from the blastocyst at an acute angle.

In some implementations, detecting trophectoderm cell junctions of the blastocyst in three-dimensional space comprises the following steps:

- gently holding the blastocyst by a holding micropipette;
- adjusting the microscopic focal plane to display trophectoderm cell junctions on the lower hemisphere of the blastocyst;
- rotating the blastocyst by the biopsy micropipette along x axis and y axis each by 360°, and capturing an image of the blastocyst section every forty-five degrees or less of rotation;
- performing image matching on the captured images to calculate the transformation matrix between the two-dimensional coordinates in the captured images and the corresponding three-dimensional coordinates;
- detecting cell junctions two dimensionally in the captured images by identifying the bright and dark edges; and
- constructing cell junctions three-dimensionally by transforming the two-dimensional cell junctions in the captured images into the corresponding three-dimensional coordinates using the transformation matrix.

In some implementations, adjusting the microscopic focal plane comprises adjusting the microscopic focal plane until the ZP of the blastocyst is in focus and moving down the focal plane until the trophectoderm cell junctions at the bottom of the blastocyst are identified.

In some implementations, positioning inner cell mass and trophectoderm cells of the blastocyst comprises the following steps:

- positioning the inner cell mass between ten o'clock and eleven o'clock or between seven o'clock and eight o'clock of the blastocyst; and
- aligning the trophectoderm cells to be collected with the biopsy micropipette orifice at the three o'clock of the blastocyst.

In some implementations, aligning the trophectoderm cells to be collected with the biopsy micropipette orifice at the three o'clock of the blastocyst comprises rotating the blastocyst by the biopsy micropipette and applying negative pressure to the biopsy micropipette orifice to ensure the entire area enclosed by the trophectoderm cells to be collected at the three o'clock of the blastocyst can be covered by the orifice of the biopsy micropipette.

In some implementations, separating trophectoderm cells from the blastocyst comprises the following steps:

- forwarding the biopsy micropipette along the axis of the biopsy micropipette and subsequently generating continuous vibration on the biopsy micropipette; and
- retracting the biopsy micropipette along the axis of the biopsy micropipette, stopping the biopsy micropipette outside the ZP of the blastocyst, and adjusting the pressure applied to the biopsy micropipette orifice to position the collected trophectoderm cells inside the biopsy micropipette.

In some implementations, the forwarding distance is more than the radius of the blastocyst and less than the diameter of the blastocyst. After said forwarding biopsy micropipette along the axis of biopsy micropipette, angles between the trophectoderm layer and the axis of the biopsy micropipette becomes less than 90°.

In some implementations, the direction of said continuous vibration on the biopsy micropipette is along the axis of the biopsy micropipette.

BRIEF DESCRIPTION OF THE DRAWINGS

The attached figures illustrate various features, aspects and implementations of, or related to, the technology described herein.

FIG. 5 is a block diagram depicting various steps of a method for collecting a predetermined number of TE cells in accordance with an implementation.

DETAILED DESCRIPTION

Techniques described herein relate to systems, devices and methods for detection and three-dimensional (3D) imaging of cell junctions on an outer cell layer of a biological structure, such as a blastocyst. Some embodiments described herein relate to detecting and modeling trophectoderm (TE) cell junctions between adjacent ones of TE cells of a blastocyst, based on a 3D image construction of the blastocyst. The 3D image construction of the blastocyst, and more particularly of the TE cells, can enable locating TE cell junctions, which in turn, can enable identifying a predetermined number of TE cells for controlling the number of TE cells that can subsequently be separated and collected during a blastocyst biopsy. The transparent/translucent nature of biological structures such as TE cells gives rise to a number of challenges when attempting to evaluate the location of the cell junctions between adjacent TE cells and controlling the number of TE cells subsequently separated and collected. The techniques described herein contribute to alleviating these challenges.

Figure 1A:
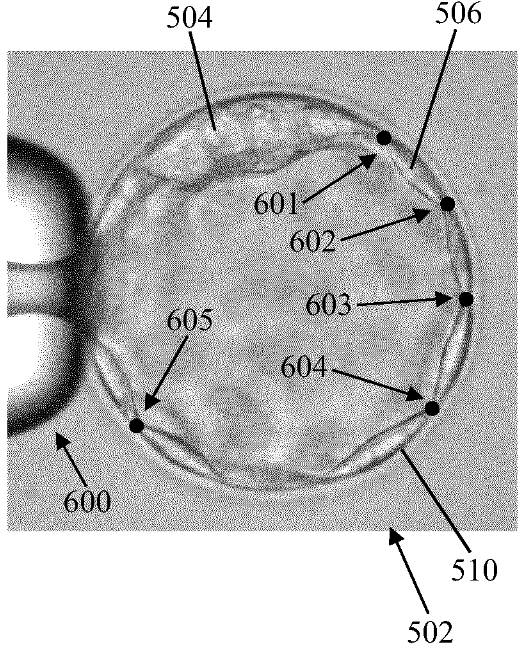
FIGS. 1(*a*)-(*b*) are prior art images showing a blastocyst (a) before and (b) after the collapse of a blastocyst cavity.
Figure 1B:
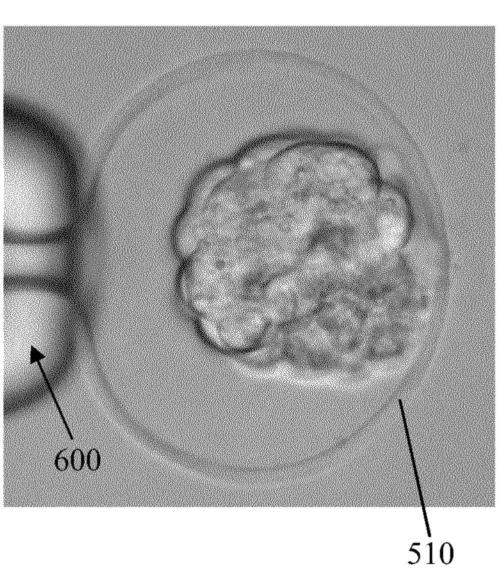

A 3D image construction of the blastocyst to detect the location of TE cell junctions and the identification of a predetermined number of TE cells for subsequent separation and collection in the context of a blastocyst biopsy present advantages over techniques known in the art for performing blastocyst biopsies. For instance, given that conventional techniques for performing blastocyst biopsies involve a repeated application of pressure on the ZP to release the TE cells from the ZP, the cavity formed by the TE cell layer generally collapses due to cavity pressure release. In such scenarios, TE cell junctions become undetectable after the collapse of the cavity, as illustrated in FIG. 1. For example, FIG. 1(*a*) illustrates a blastocyst 502 being held in position by a holding micropipette 600. The blastocyst 502 has an ICM 504 and TE cells 506 and associated TE junctions 601, 602, 603, 604 and 605. FIG. 1(*b*) illustrates the collapsed blastocyst cavity resulting from the repetitive application of pressure on the ZP 510. Furthermore, regardless of the blastocyst cavity collapsing when conventional biopsy techniques are used, the complex structure of a blastocyst has so far precluded the development of cell junction detection in the TE cell layer, particularly due to the transparent/translucent nature of the TE cells, as mentioned above.

Thus, instead of estimating the number of collected TE cells in accordance with the total cell volume aspirated into a corresponding biopsy micropipette, techniques described herein enable imaging and 3D modeling of TE cell junctions. The imaging and 3D modeling operations can allow for the identification of a predetermined number of intact TE cells. These TE cells can subsequently be separated and collected from the blastocyst for performing preimplantation genetic testing.

In the present description, the term "transparent" refers to the capability of an object (e.g., a blastocyst or another biological structure) of allowing electromagnetic radiation in a certain spectral region to pass therethrough without appreciable scattering. The term "translucent" refers to the capability of an object (e.g., a blastocyst or another biological structure) of allowing electromagnetic radiation in a certain spectral region to pass therethrough with appreciable scattering. The term "translucent" is generally synonymous with the term "partly transparent". In this regard, it is understood that the term "transparent" includes not only "completely transparent", but also "substantially transparent", "sufficiently transparent", and "partly transparent". As such, unless specified otherwise, the term "transparent", when used alone, is meant to encompass the term "translucent".

In the present description, the term "embryos/blastocysts" refers to mammalian embryos/blastocysts (e.g., human embryos/blastocysts, mouse embryos/blastocysts, and bovine embryos/blastocysts). It is appreciated that although several embodiments described herein are implemented with blastocysts, other embodiments may use other types of biological structures whose cell junctions can be detected and 3D imaged. Non-limiting examples of such possible biological structures include, to name a few, spheroids formed by stem cells or tumor cells.

In the present description, the term "cell junctions" refers to connecting edges/points between neighboring cells.

In the present description, the term "intact" refers to the property that cells maintain the integrity of cell membrane with the function of selective permeability.

In the present description, the term "x axis" generally refers to the axis of a holding micropipette whose direction is pointing from the holding micropipette to the blastocyst.

In the present description, the term "y axis" generally refers to the axis rotated from x axis counterclockwise by 90° in the focal plane under a microscopic view.

In the present description, the term "z axis" generally refers to the axis perpendicular to the focal plane under a microscopic view whose direction is pointing from the bottom of the structure holding the blastocyst (e.g., culture dish) to the blastocyst.

Various implementations of the present techniques will now be described with reference to the figures.

General Description of a Blastocyst Biopsy Procedure

Figures 2A, 2B, 2C, 2D:
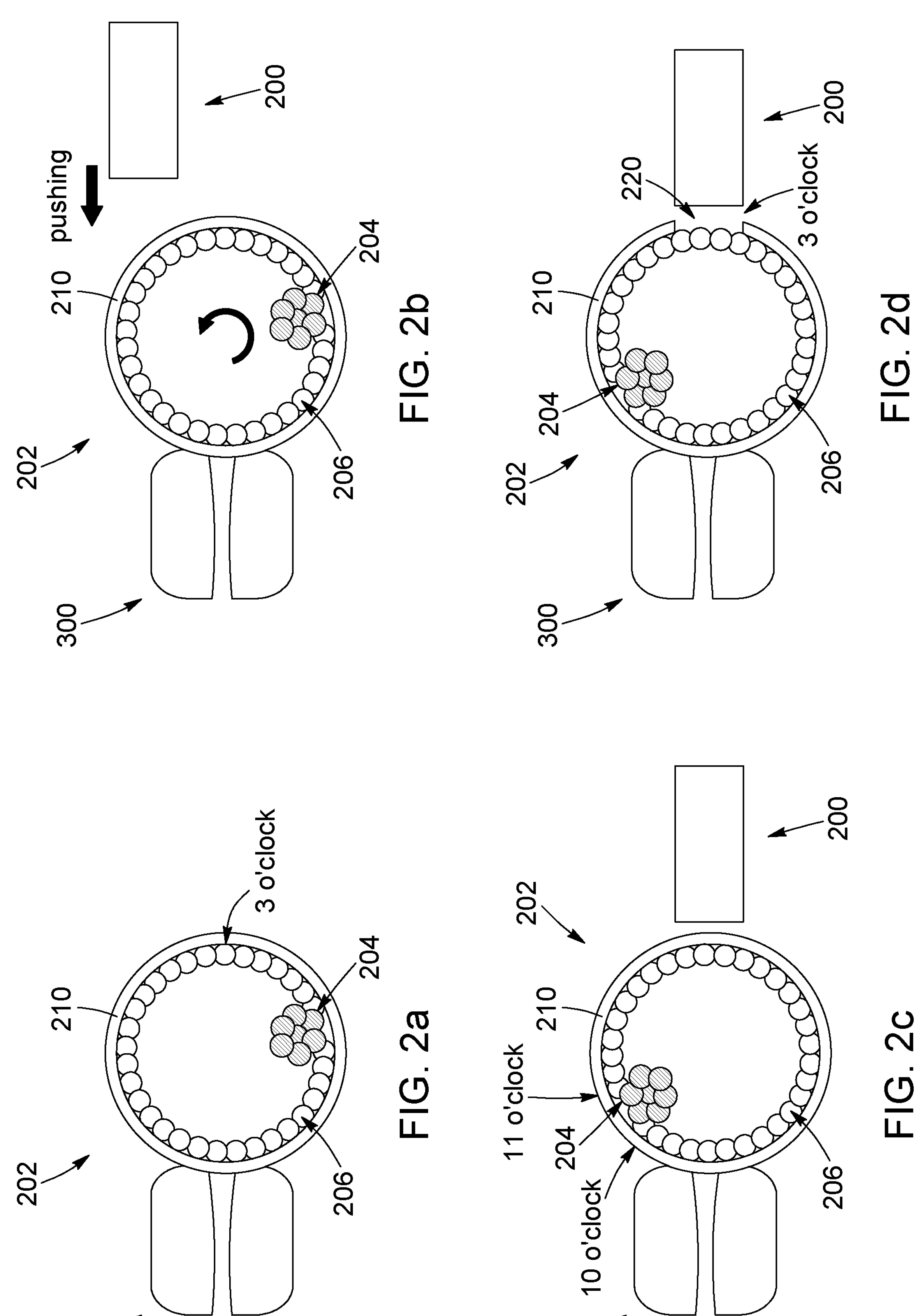
FIGS. 2(*a*)-(*h*) are schematic representations of various steps of a method for collecting TE cells in accordance with an implementation.
Figures 2E, 2F, 2G, 2H:
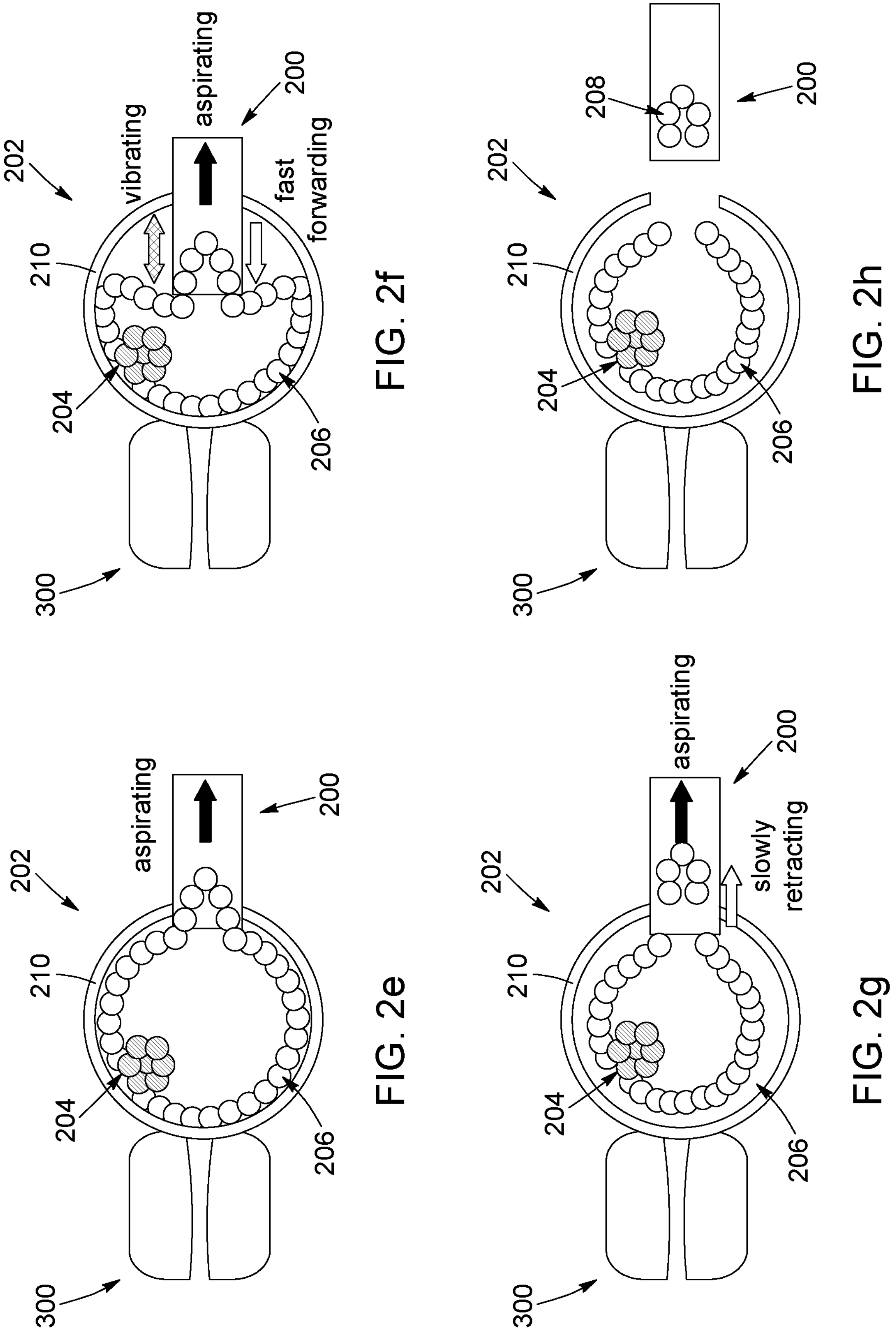
Figures 3A, 3B, 3C:
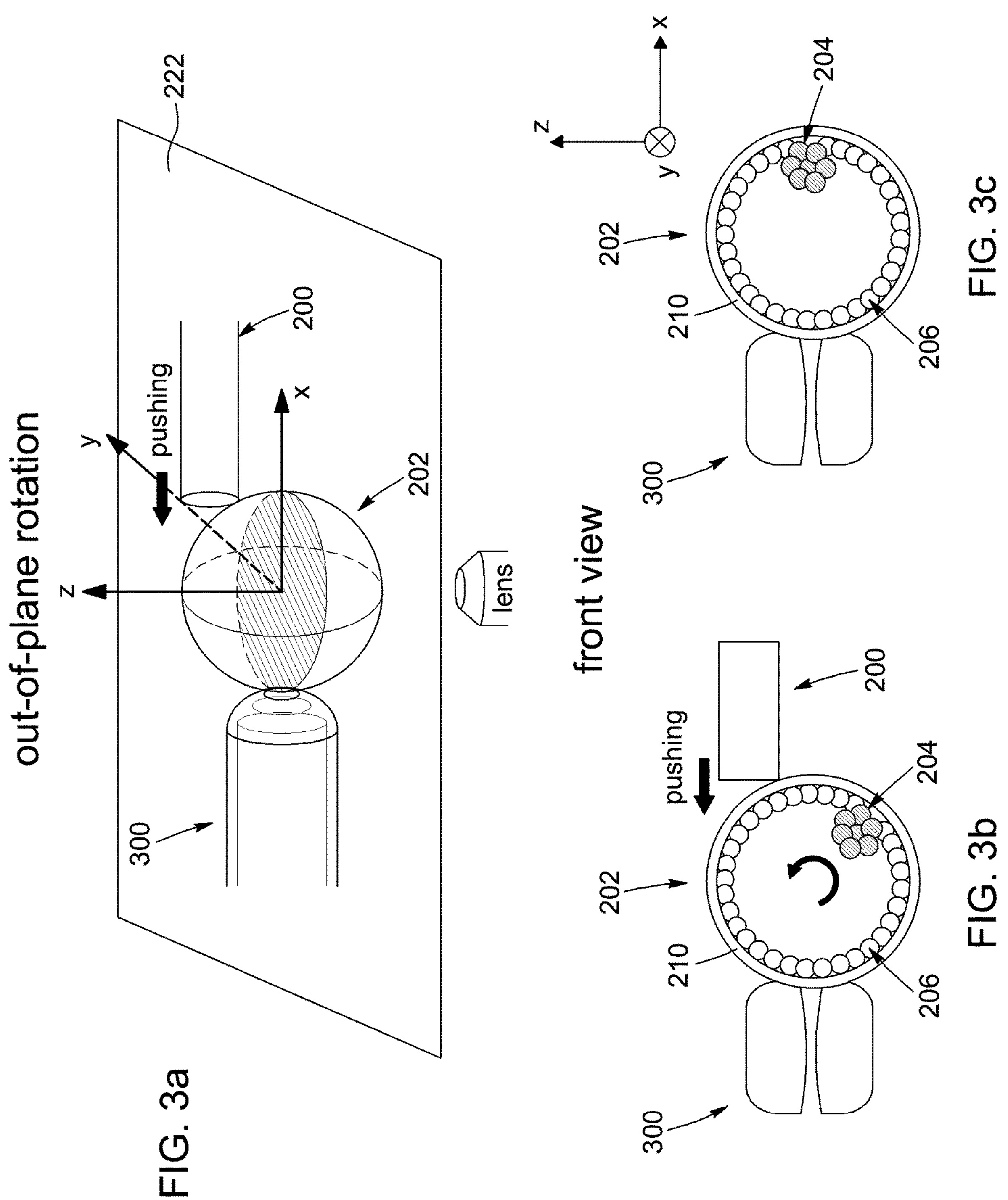
FIGS. 3(*a*)-(*f*) are schematic representations of various steps for performing an out-of-plane blastocyst rotation and an in-plane blastocyst rotation in accordance with an implementation.
Figures 3D, 3E, 3F:
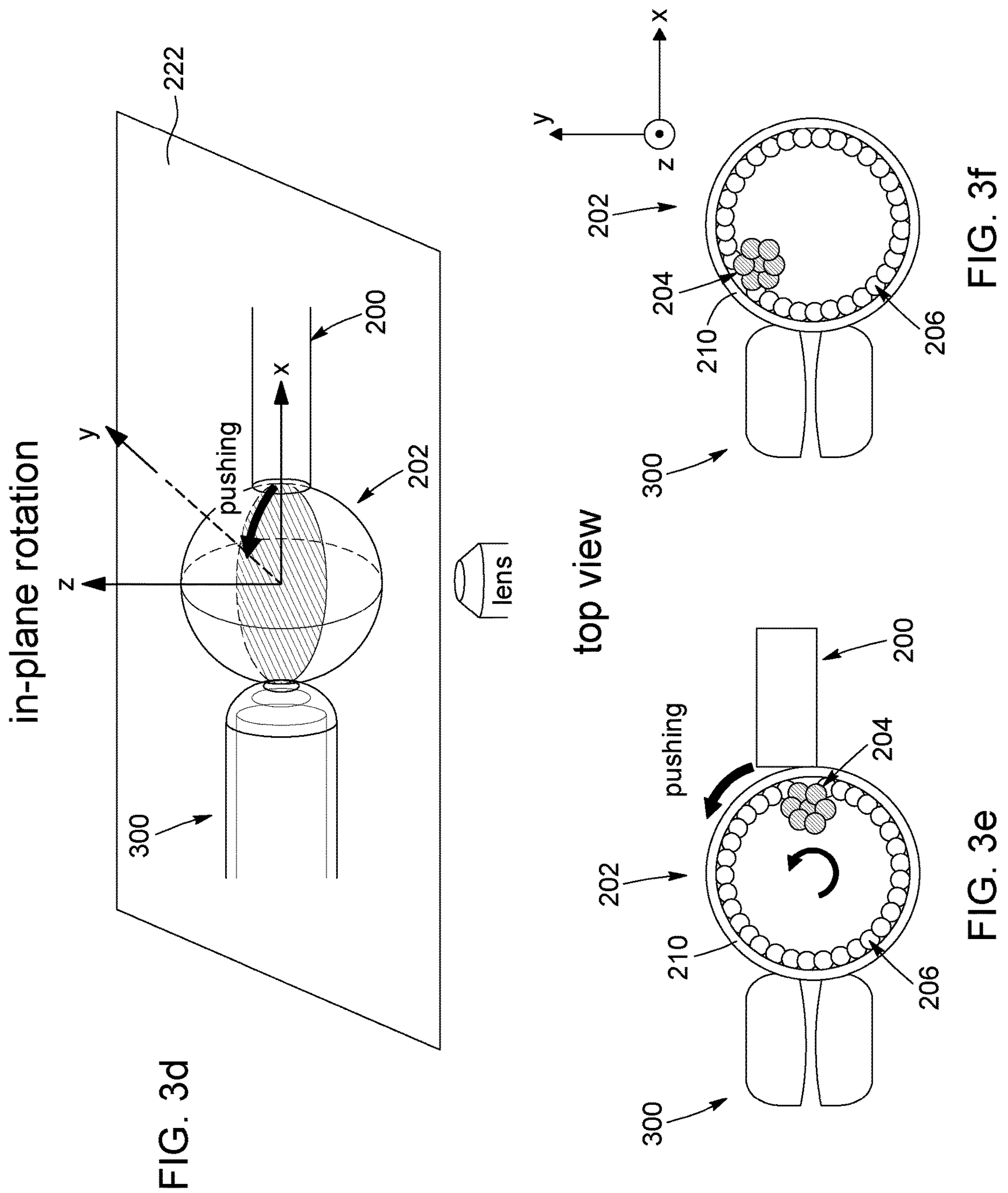
Figure 4:
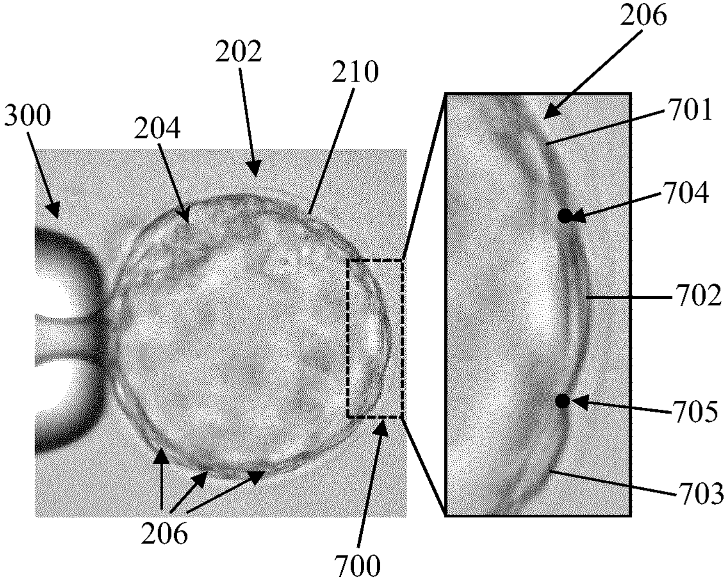
FIG. 4 is an image of a blastocyst held by a holding micropipette and an image of an enlarged region of the blastocyst and associated TE cell junctions.

With reference to FIGS. 2-4, a method for collecting a predetermined number of intact trophectoderm (TE) cells in the context of a blastocyst biopsy will be described in further detail.

The blastocyst biopsy can be initiated by holding a blastocyst 202 in a given position, for instance using a holding micropipette 300 or another holding or positioning device. As illustrated in FIG. 2(*a*), the blastocyst 202 includes a fist-shaped cluster of cells forming the ICM 204 and a monolayer of TE cells 206 that forms a spherical cavity inside which is the ICM 204. The TE cells 206 are surrounded and protected by a glycoprotein layer that is referred to as the zona pellucida (ZP) 210.

A biopsy micropipette 200 can be used to rotate the blastocyst 202 as the blastocyst 202 is held by the holding micropipette 300 to position the ICM 204 of the blastocyst 202 between the ten o'clock position and the eleven o'clock position of the blastocyst 202, as shown in the sequence illustrated in FIGS. 2(*a*)-2(*c*). A negative pressure can be applied to the tip of the holding micropipette 300 by a pneumatic or hydraulic pump to hold the blastocyst 202 in position. In some implementations, the pressure applied to the tip of the holding micropipette 300 can depend on the stiffness of the ZP 210 of the blastocyst 202. For example, to hold a mouse blastocyst, the pressure applied to the tip of the holding micropipette 300 can be between −300 Pa and −600 Pa.

A breach 220 can be created in the ZP 210 at the three o'clock position of the blastocyst 202 using laser pulses or mechanical forces without causing the cavity of the blastocyst to collapse, as depicted in FIG. 2(*d*). The diameter of the breach 220 can be the same as or larger than the diameter of the biopsy micropipette 200 to allow the biopsy micropipette 200 to be inserted through the ZP 210 and reach the TE cell layer.

After the penetration of the ZP 210, the biopsy micropipette 200 can be advanced to gently contact the TE cell layer. A negative pressure can be generated and gradually increased by a pneumatic or hydraulic pump and applied to the tip of the biopsy micropipette 200 to aspirate TE cells 206 into the biopsy micropipette 200, as depicted in FIG. 2(*e*). In some implementations, the negative pressure can be gradually increased until a desired or predetermined number of TE cells, such as 5 to 8 TE cells, are aspirated into the biopsy micropipette 200. After aspiration, the biopsy micropipette 200 can be fast forwarded along the longitudinal axis of the biopsy micropipette 200, and a vibration along the longitudinal axis of the biopsy micropipette 200 can be generated on the biopsy micropipette 200, as depicted in FIG. 2(*f*). In some implementations, the forwarding distance can be more than the radius of the blastocyst and less than the diameter of the blastocyst. In other implementations, the forwarding distance can be less than the radius of the blastocyst. Any device that can generate an axial vibration along the longitudinal axis of the biopsy micropipette 200 can be suitable to separate TE cells 206. For instance, in some implementations, a piezoelectric actuator can be used to generate vibrations along the longitudinal axis of the biopsy micropipette 200. The piezoelectric actuator can be driven by a continuous signal with a frequency ranging from about 50 to 5000 Hz. A vibration can be generated on the biopsy micropipette 200 by vibrating the piezoelectric actuator to excise, or separate, the predetermined number of TE cells from the blastocyst. After the TE cells 208 are separated from the blastocyst 202, the biopsy micropipette 200 can then be retracted along the longitudinal axis of the biopsy micropipette 200 and the piezoelectric actuator can be turned off, as depicted in FIG. 2(*g*). The pressure applied to the tip of the biopsy micropipette 200 by the pneumatic or hydraulic pump can be adjusted to position the collected TE cells 208 inside the biopsy micropipette 200, as depicted in FIG. 2(*h*). The above-mentioned steps can be achieved manually or be automated or partially automated. In some implementations, the blastocyst can be rotated manually, and a device that generates axial vibrations can be controlled via a software interface. For example, when a piezoelectric actuator is used, the piezoelectric actuator can be operatively connected to a controller, which is in turn operatively connected to a computer. A software can then be used to send instructions to the controller to control the operation of the piezoelectric actuator. A similar configuration can be used for a device generating an axial vibration that is different than a piezoelectric actuator.

With reference to FIGS. 3(*a*)-3(*f*), in some implementations, the rotation of the blastocyst 202 can involve an out-of-plane rotation or an in-plane rotation, or both. The terms "out-of-plane" and "in-plane" are defined herein with reference to a focal plane of a microscope used for imaging the blastocyst 202. In FIGS. 3(*a*) and 3(*d*), the x axis and the y axis are contained in the focal plane 222, and the z axis is normal to the focal plane 222.

With reference more particularly to FIG. 3(*a*)-(*c*), an out-of-plane rotation of a blastocyst 202 using a holding micropipette 300 and a biopsy micropipette 200 is shown. Initially, the ICM 204 may not be detected in the image plane (e.g., if the ICM 204 is outside the depth of field of the imaging system, on either side of the focal plane), and the biopsy micropipette 200 can be located several micrometers, e.g., 2-5 μm, away from the ZP 210 of the blastocyst 202. Next, the biopsy micropipette 200 can be lifted upwardly along the z axis. The upward distance travelled by the biopsy micropipette 200 along the z axis can depend for instance on the diameter of the blastocyst. In some implementations, the upward distance travelled by the biopsy micropipette 200 can be in the range of between about 20 μm to about 40 μm for blastocysts having with a diameter of about 100 μm. The biopsy micropipette 200 can then be forwarded along the x axis to gently push the blastocyst 202. By pushing the blastocyst 202, the blastocyst 202 can be rotated about the y axis, corresponding to an out-of-plane rotation. The forward distance travelled by the biopsy micropipette 200 to push and rotate the blastocyst 202 can depend on the diameter of the blastocyst 202, and can range for instance between about 15 μm and about 35 μm for blastocysts having a diameter of about 100 μm. After pushing the blastocyst 202, the biopsy micropipette 200 can be retracted along the x axis. The distance to retract the biopsy micropipette 200 can be the similar or the same as the forward distance travelled by the biopsy micropipette 200. The biopsy micropipette 200 can be used to push the blastocyst repeatedly. Once the ICM 204 becomes visible in the image plane 222 under a microscopic view, the out-of-plane rotation can be stopped.

With reference now to FIG. 3(*d*)-(*f*), an in-plane rotation of a blastocyst 202 using a holding micropipette 300 and a biopsy micropipette 200 is shown. In some implementations, the in-plane rotation can be performed following completion of the out-of-plane rotation described above. The in-plane rotation can be used to position the ICM 204 between the ten o'clock position and the eleven o'clock position of the blastocyst 202. Initially, the biopsy micropipette 200 can be positioned at the three o'clock position of the blastocyst 202. The biopsy micropipette 200 can be used to indent the ZP 210, for instance by about 2 μm to about 5 μm, to induce a sufficient frictional force on the ZP 210. Next, the biopsy micropipette 200 can be used to push the blastocyst 202 along the curve of the ZP 210. By pushing the blastocyst 202, the blastocyst 202 can be rotated about the z axis. After the blastocyst 202 is rotated, for instance by about 5° to about 45°, the rotation of the biopsy micropipette 200 can be stopped and the biopsy micropipette 200 can be repositioned at the three o'clock position of the blastocyst 202. The biopsy micropipette 200 can be used to push the blastocyst 202 repeatedly. Once the ICM 204 is positioned between the ten o'clock position and the eleven o'clock position of the blastocyst 202, the in-plane rotation can be stopped.

As mentioned above, the techniques described herein can include the detection of TE cell junctions. FIG. 4 illustrates examples of localizations of TE cell junctions. A region of interest 700 in which TE cell junctions 704, 705 are detected can contain several TE cells 206 between the two o'clock position and the four o'clock position of the blastocyst 202. In some implementations, the TE cells 206 within the region 700 can be separated from the image background by detecting the dark edges 701, 702 and 703 of the TE cells 206. The waists where the curve formed by the dark edges 701, 702 and 703 becomes concave can be identified as TE cell junctions, as shown by the points, i.e., dots, 704 and 705. After the TE cell junctions 704, 705 are detected, the biopsy micropipette 200 can be used to rotate the blastocyst 202 in-plane so that the TE cell junctions 704 and 705 are symmetric with respect to the three o'clock position of the blastocyst 202. The blastocyst 202 can be rotated clockwise or counter-clockwise, or moved in a suitable direction or rotated about a suitable axis, to move target TE cell junctions towards a position to generally align with a position of the biopsy micropipette 200 for ZP penetration. It is noted that the biopsy micropipette 200 can also be aligned at the three o'clock position of the blastocyst 202 for ZP penetration.

An implementation of the above described method is summarized below, with reference to FIG. 5. The method includes holding a blastocyst using a holding micropipette, for instance with a pressure applied to the holding micropipette that can range between −300 Pa and −600 Pa. A biopsy micropipette can be used to perform out-of-plane and in-plane rotation to position the ICM of the blastocyst between the ten o'clock position and the eleven o'clock position of the blastocyst. The TE cell junctions can be identified between the two o'clock position and the four o'clock position of the blastocyst. The biopsy micropipette can be used to slightly rotate the blastocyst in-plane to ensure that the TE cell junctions positioned between the two o'clock position and the four o'clock position of the blastocyst are substantially symmetric with respect to the three o'clock position of the blastocyst. The pressure applied to the holding micropipette can be increased from −300 Pa-−600 Pa to −1000 Pa-−1500 Pa. The biopsy micropipette can be used to indent the ZP of the blastocyst by about 2 μm to about 5 μm at the three o'clock position of the blastocyst. A negative pressure of about −200 Pa and vibrations with an amplitude of about 1 μm to about 2 μm can be applied to the tip of the biopsy micropipette to enable ZP penetration. The biopsy micropipette can be used to indent the TE cell layer of the blastocyst by about 10 μm to about 20 μm. The negative pressure applied to the tip of the biopsy micropipette can be increased gradually to aspirate a desired or predetermined number of TE cells, which can range for instance between 5 to 8 TE cells, into the biopsy micropipette. The biopsy micropipette can be subjected to a continuous vibration between about 50 Hz and about 100 Hz and fast forwarded by about 40 μm to about 60 μm, for instance within less than about 1 second, along the longitudinal axis of the biopsy micropipette. In some embodiments, the forwarding distance can be more than the radius of the blastocyst (for example, when the blastocyst diameter is about 100 μm). The biopsy micropipette, with a continuous vibration between about 50 Hz and about 100 Hz, can then be retracted along the longitudinal axis of the biopsy micropipette until the TE cells inside the biopsy micropipette are separated from the blastocyst. The pressure applied to the tip of the biopsy micropipette can be adjusted to position the collected trophectoderm cells at a desired position along the biopsy micropipette.

Apparatus for Performing a Blastocyst Biopsy

Figure 6:
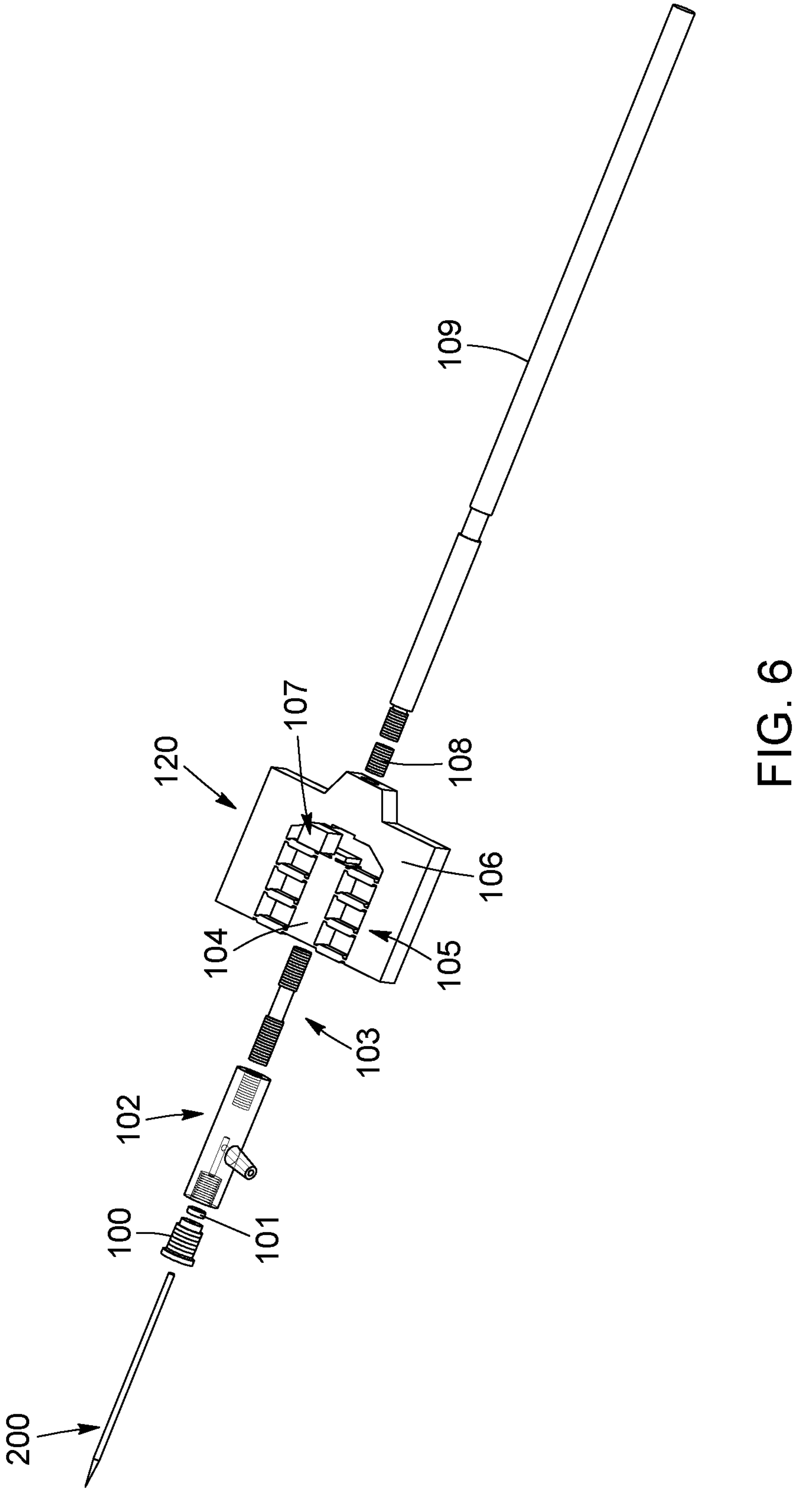
FIG. 6 is a schematic representation illustrating an exploded view of a piezo-driven apparatus for use in a method for collecting TE cells.
Figure 7:
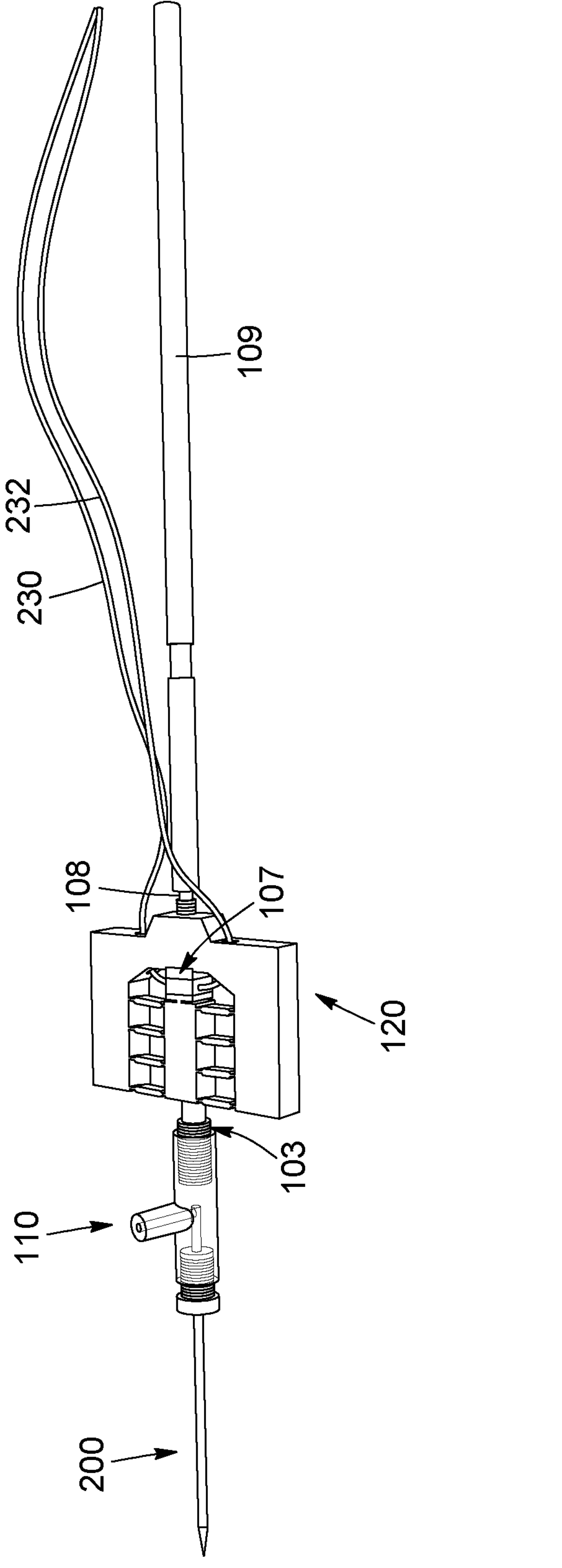
FIG. 7 is a picture of the piezo-driven apparatus of FIG. 6.

With reference to FIGS. 6 and 7, an example of an apparatus for performing a blastocyst biopsy according to the techniques described herein is shown. The apparatus includes a biopsy micropipette 200, a micropipette holder 110 which can include a screw cap 100, a gasket 101 and a cylindrical body 102 with a port for tubing connection, a flexure guide 120 which can include a central structure 104, a set of flexure beams 105 and a flexure base 106, a piezoelectric actuator 107, which can be operatively connected to an electric piezo driver via wires 230 and 232, and a holding rod 109.

The installation of the biopsy micropipette 200 can include inserting the biopsy micropipette 200 into the cylindrical body 102 of the micropipette holder 110 through the screw cap 100 and the gasket 101 when the screw cap 100 is loosened, and tightening the screw cap 100 to seal the gap between the gasket 101 and the biopsy micropipette 300. The micropipette holder 110 can be connected to a tubing via the port on the cylindrical body 102, and the tubing can be further connected to a pneumatic or hydraulic pump to apply a negative or positive pressure at the tip of the biopsy micropipette 200. The micropipette holder 110 can be installed on the central structure 104 of the flexure guide 120 by a screw 103. The axis of the cylindrical body 102 of the micropipette holder 110 is coaxial with the guiding direction of the flexure guide 120.

The installation of the piezoelectric actuator 107 can include placing the piezoelectric actuator 107 between the back of the central structure 104 of the flexure guide 120 and the flexure base 106 of the flexure guide 120, and fastening the piezoelectric actuator 107 with a mechanical fastener 108, such as a screw, to the flexure base 106. The holding rod 109 can be installed on the flexure base 106 of the flexure guide 120 by the screw structure on the holding rod 109. The axis of the holding rod 109 is coaxial with the guiding direction of the flexure base 106 of the flexure guide 120.

Detection and 3D Imaging of TE Cell Junctions

Figure 8:
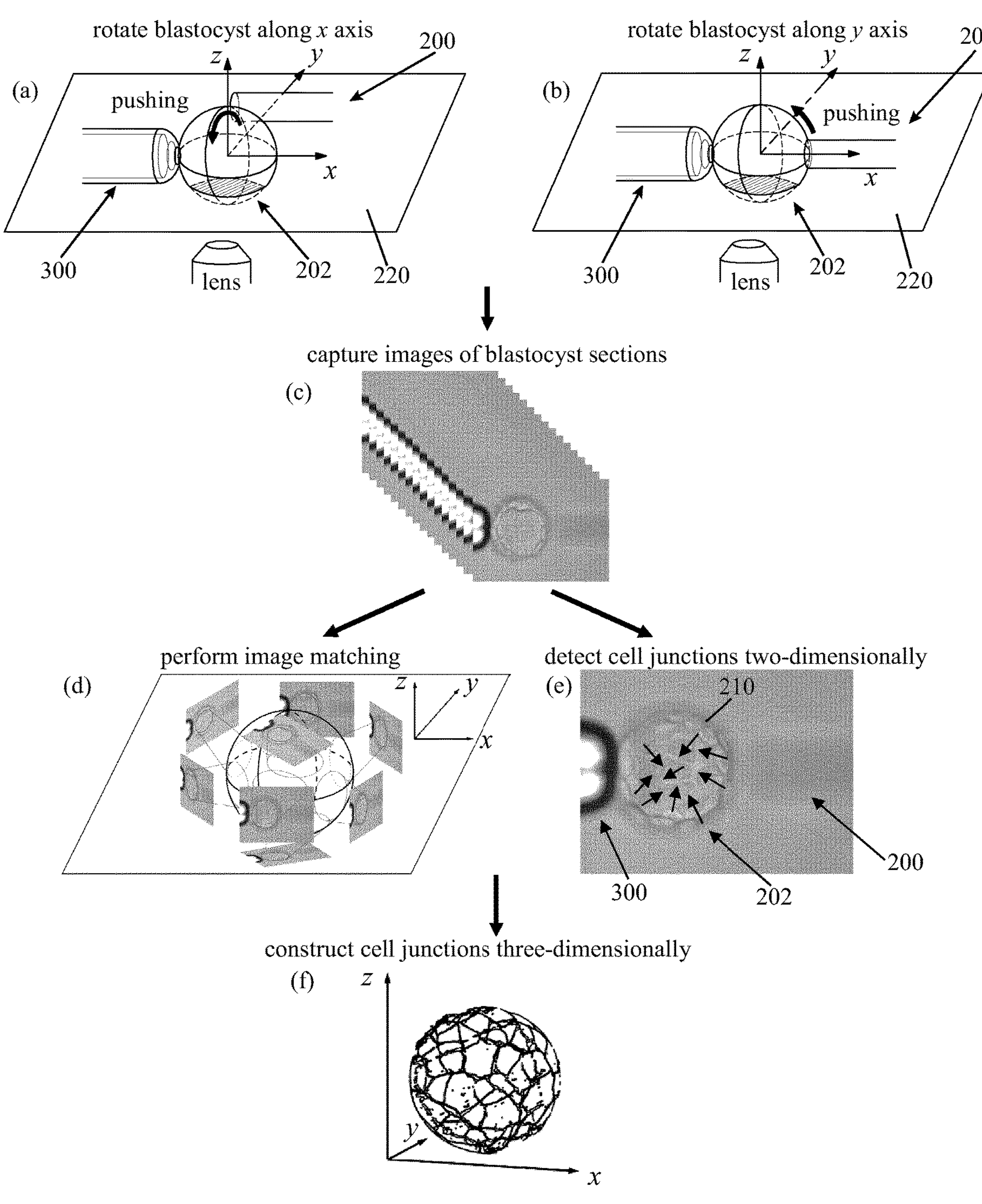
FIGS. 8(*a*)-(*f*) are schematic representations of various steps of a method for performing a three-dimensional image construction of a blastocyst and detecting TE cell junctions of the blastocyst in accordance with an implementation. Arrows in (e) within the blastocyst indicate two-dimensional TE cell junctions.

FIG. 8 illustrates an example of a method for detecting and 3D imaging of a TE cell layer including TE cells separated by TE cell junctions.

The method can include holding the blastocyst in a given position, for instance using a holding micropipette 300. The pressure applied to the tip of the holding micropipette 300 can depend for instance on the stiffness of the ZP 210 of the blastocyst. For example, to hold a mouse blastocyst in a given position, the pressure applied to the tip of the holding micropipette 300 can be between about −300 Pa and about −600 Pa. The focal plane 220 of a microscope or imaging system used for imaging the blastocyst 202 can be adjusted until the outer edge of the ZP 210 of the blastocyst 202 is in focus. The center (O) and radius (R) of the circular area formed by the TE cell layer in the image can then be measured. Next, the microscopic focal plane can be moved down until the TE cell junctions in the lower hemisphere of the blastocyst, i.e., in a bottom region of the blastocyst, can be identified. FIGS. 8(*a*)-(*b*) show the position of the microscopic focal plane 220 after adjustment, and FIG. 8(*e*) shows the image of the blastocyst 202 including the TE cell junctions at this focal plane.

In some implementations, the imaging system can include a conventional bright-field microscope connected to a camera. As described in greater detail below, in some implementations, the microscope can include contrast-enhancing modules to enhance the contrast of acquired images. Non-limiting examples of contrast-enhancing modules include a phase contrast imaging module and a differential interference contrast (DIC) imaging module.

It is appreciated that the configuration illustrated in FIG. 8 corresponds to an inverted microscope arrangement, where the objective lens is below the sample stage. In such a case, the microscopic focal plane 220 is positioned at the bottom region of the blastocyst 202, which is the blastocyst region that is closest to the objective lens. The reason is that an image of the blastocyst region that is closest to the objective lens is generally clearer (e.g., less blurry and/or distorted) than an image of the blastocyst region that is farther away from the objective lens (i.e., the top blastocyst region in FIG. 8). It is also appreciated that in other embodiments, an upright microscope arrangement may be used where the objective lens is above the sample stage. In such a case, the microscopic plane may be moved to be aligned with the top region of the blastocyst 202, which in this configuration is the blastocyst region that is the closest to the objective lens.

After adjusting the microscopic focal plane, a biopsy micropipette 200 can be used to rotate the blastocyst 202 about the x axis, as illustrated in FIG. 8(*a*), and about the y axis, as illustrated in FIG. 8(*b*), each by 360°. In the illustrated embodiment, both the x axis and the y axis are coplanar with the focal plane 220. An image of the blastocyst 202 can be captured every 45° or less of rotation to ensure a sufficient overlap between two consecutively captured images for performing subsequent imaging matching. Image matching can be performed on the captured images to calculate the transformation matrix between the two-dimensional (2D) coordinates in the captured images and the corresponding three-dimensional coordinates, as illustrated in FIG. 8(*d*). TE cell junctions can be detected by identifying bright and dark edges in the 2D captured images.

Depending on the application, the identification of TE cell junctions (e.g., by edge detection) in the set of captured images can be made based on human assessment, computer assessment, or a combination of both. When TE cell junction identification is made at least partly by a computer, a processing unit may be configured to receive the set of captured images and analyze the captured images to assess whether they contain features indicative of the presence of TE cell junctions. It is appreciated that various computer-implemented and software-based image analysis tools and techniques may be employed for this purpose. Such tools and techniques may use contrast enhancement based on feature extraction and pattern recognition, and may rely on machine learning and/or artificial intelligence. In FIG. 8(*e*), arrows within the blastocyst indicate cell junctions in a captured image. Afterwards, a 3D model of the TE cell layer can be constructed by projecting the TE cell junctions identified in the set of captured images onto a virtual 3D model of the outer surface of the blastocyst 202, for example, using the transformation matrix, as illustrated in FIG. 8(*f*).

Various methods can be used for performing image matching. Algorithms such as scale-invariant feature transform (SIFT), speeded-up robust features (SURF) and oriented FAST and rotated BRIEF (ORB), and software tools such as Autodesk123D, Regard3D and VisualSFM, can be used to calculate the transformation matrix between the two-dimensional coordinates on the captured images and the corresponding three-dimensional coordinates in the 3D model.

Figure 9:
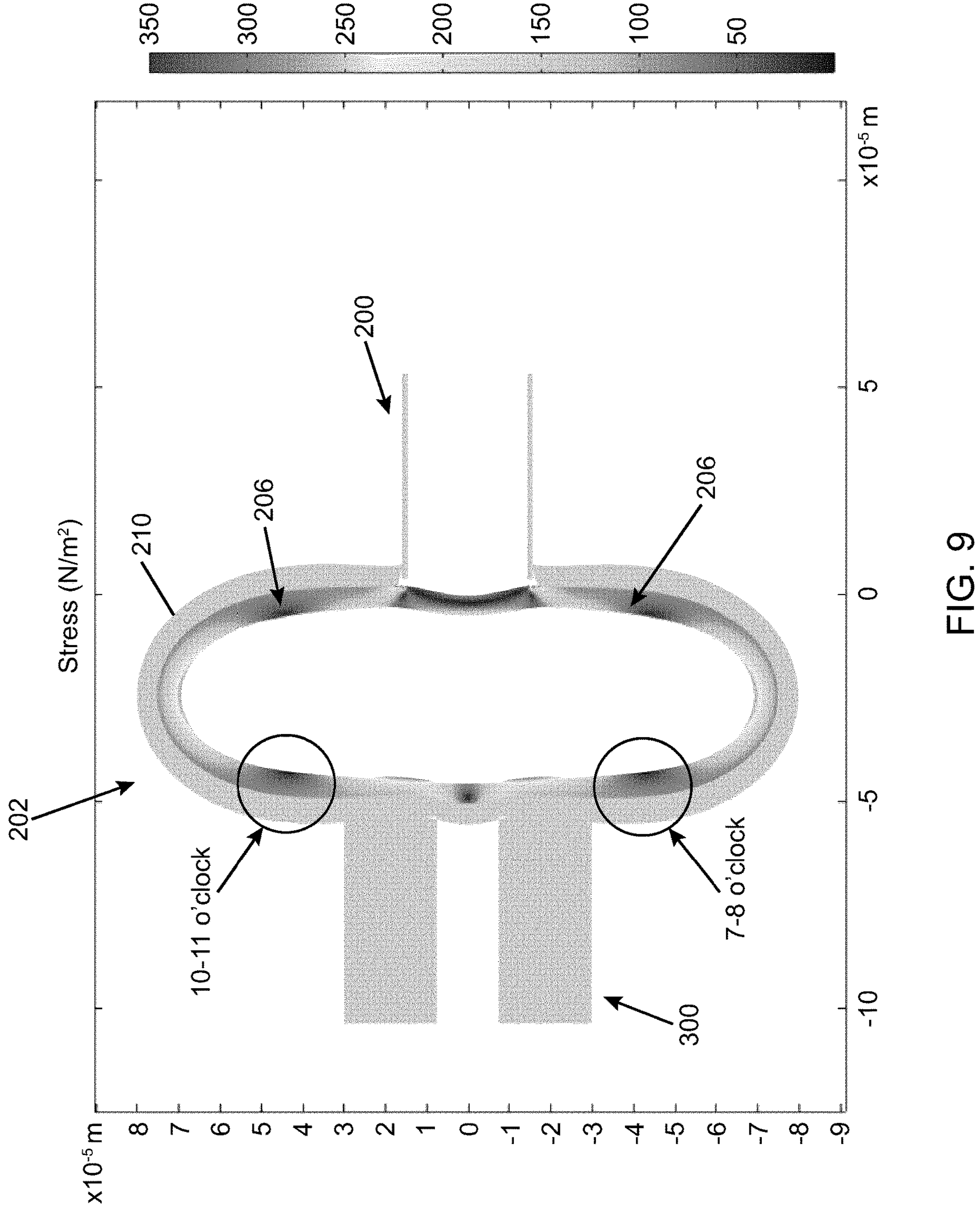
FIG. 9 is a FEA simulation result showing the stress distribution on the TE cell layer of a blastocyst when a biopsy micropipette is forwarded along its longitudinal axis.
Figure 10A:
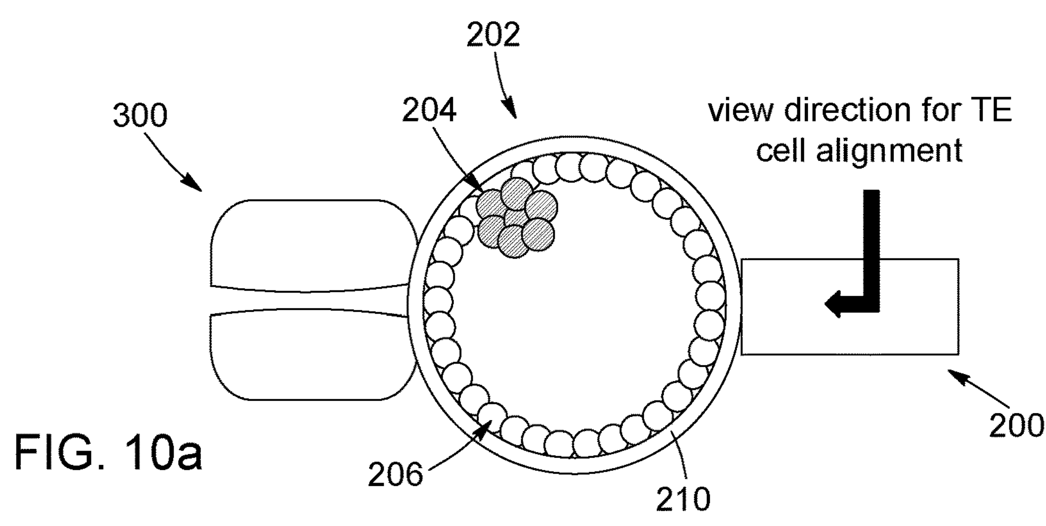
FIGS. 10(*a*)-(*e*) are schematic representations of various steps of a method for positioning target TE cells in relation with an orifice of a biopsy micropipette in accordance with an implementation.
Figure 10B:
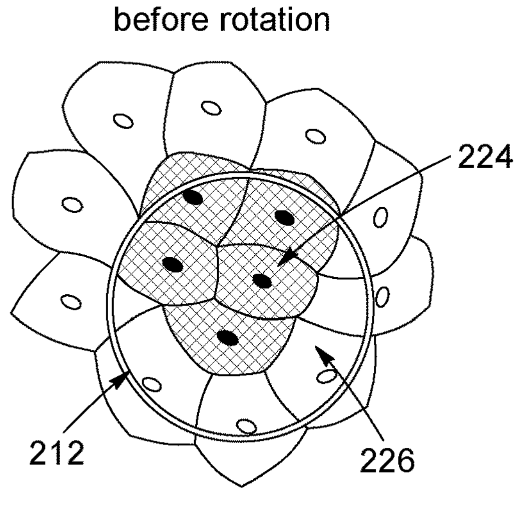
Figure 10C:
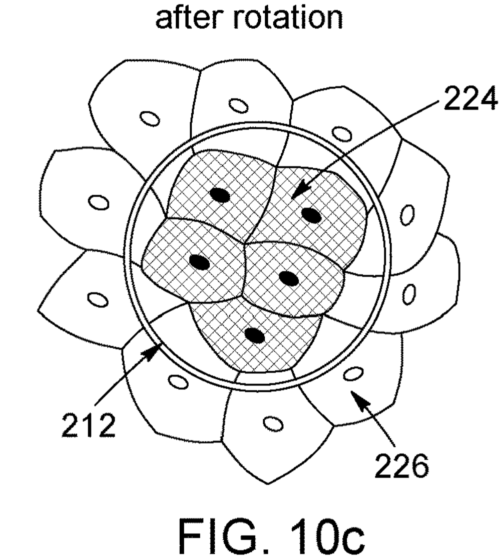
Figure 10D:
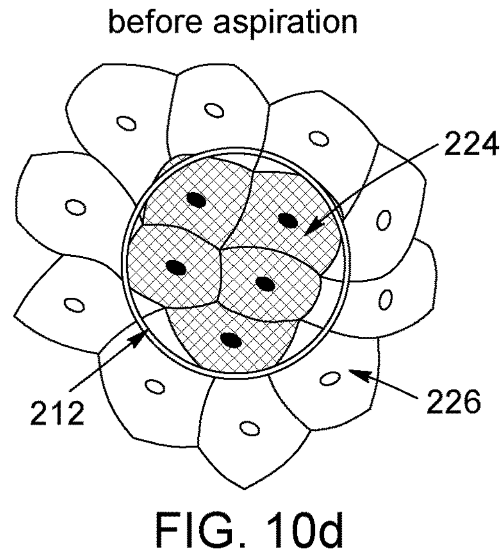
Figure 10E:
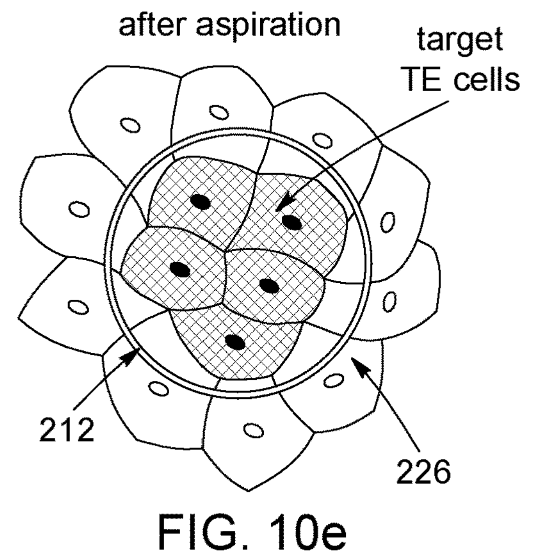

In some implementations, the method can include orienting and positioning the ICM of the blastocyst at a given location. A biopsy micropipette can be used to rotate the blastocyst and position the ICM of the blastocyst between the ten o'clock position and the eleven o'clock position of the blastocyst, or between the seven o'clock position and the eight o'clock of the blastocyst. FIG. 9 shows the result of a finite element analysis (FEA) simulation of the stress distribution on the TE cell layer of a blastocyst 202 held by a holding micropipette 300 at the nine o'clock position when a biopsy micropipette 200 is forwarded along its longitudinal axis to contact the blastocyst 202 at the three o'clock position. In the illustrated implementation, the stress applied to the blastocyst 202 is minimum between the ten o'clock position and the eleven o'clock position and between the seven o'clock position and the eight o'clock position of the blastocyst 202, as shown by the circled dark regions. Given the lower stress exerted on these regions of the TE cell layer, it can be beneficial to separate TE cells 206 from the TE cell layer when the ICM is located at either one of these locations. As illustrated in FIG. 9, the stress applied between the one o'clock position and the two o'clock position and the stress applied between the four o'clock position and the five o'clock position of the blastocyst 202 are also small, as shown by the dark regions. However, given that these two regions are located close to the tip of the biopsy micropipette 200 when the biopsy micropipette 200 is in contact with the blastocyst 202, the risk of damaging the ICM if the ICM is positioned at either one of these two regions may be increased when performing the biopsy.

Figure 11A:
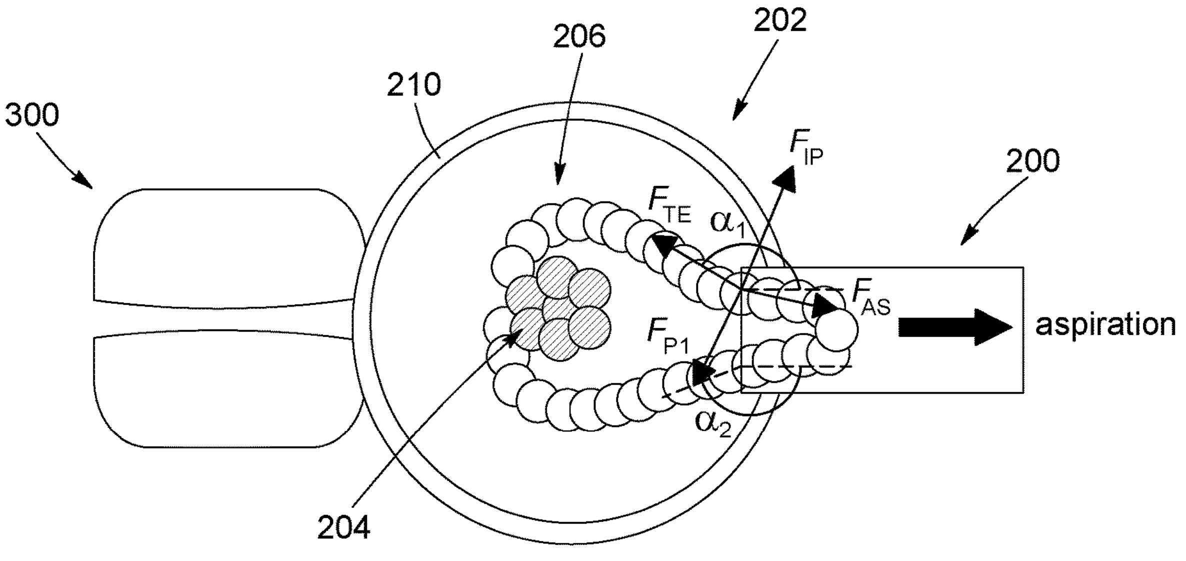
FIG. 11 is a schematic representation illustrating force analysis on TE cells inside a biopsy micropipette in accordance with (a) a conventional method and (b) an implementation of a method for collecting a predetermined number of TE cells as described herein.
Figure 11B:
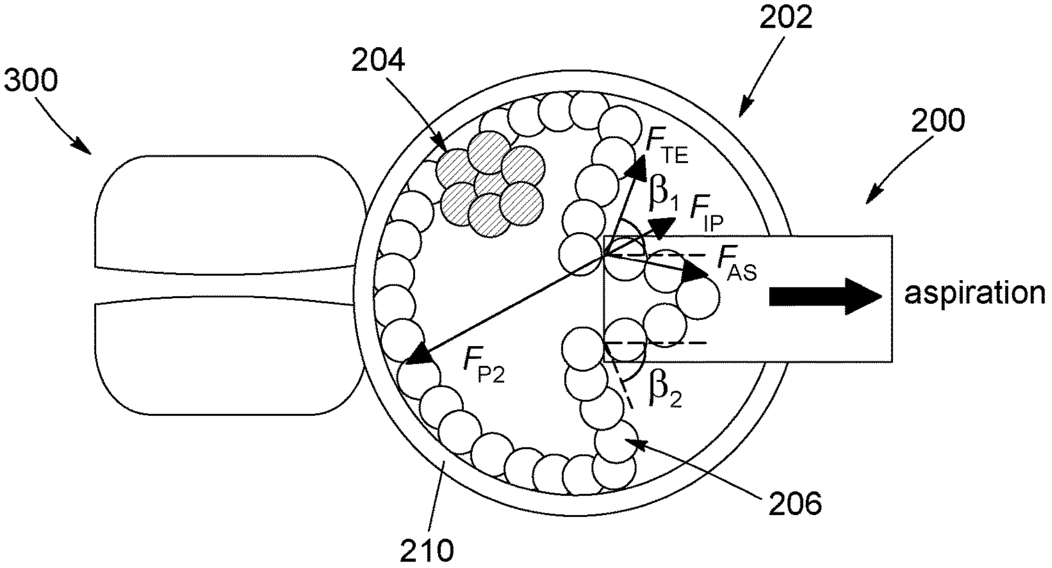

With reference now to FIGS. 10 and 11, in some implementations, the method can include positioning a predetermined number of TE cells of the blastocyst 202 at a given location in relation with the tip of the biopsy micropipette 200. After positioning the ICM 204 of the blastocyst 202, for instance between the ten o'clock position and the eleven o'clock position of the blastocyst 202, or between the seven o'clock position and the eight o'clock of the blastocyst 202, the biopsy micropipette 200 can be used to rotate the blastocyst 202 to position a predetermined number of TE cells 206, which can also be referred to as target TE cells 224 (and appear in a shaded grey in FIGS. 10(*b*)-10(*d*)), at least partially within an area defined by an orifice 212 of the biopsy micropipette 200 having its longitudinal axis aligned with the three o'clock position of the blastocyst 202. In some implementations, after alignment of the target TE 224 cells with the orifice 212 of the biopsy micropipette 200, the area enclosed by the target TE cells 224 is substantially entirely covered by the orifice 212 of the biopsy micropipette 200 at the three o'clock position of the blastocyst 202. For example, FIG. 10(*a*) shows the position of target TE cells 224 (in shaded grey) in relation to the orifice 212 of the biopsy micropipette 200 that is located at the three o'clock position of the blastocyst 202. Due to misalignment, a portion of the target TE cells 224 is located outside the area defined by the orifice 212 of the biopsy micropipette 202. In this scenario, the blastocyst 202 can be rotated clockwise to move the target TE cells 224 downwardly. FIG. 10(*b*) shows all the target TE cells 224 being covered by the biopsy micropipette orifice 212 following rotation of the blastocyst 202 and the downward movement of the target TE cells 224.

It is to be understood that in other implementations, the target TE cells 224 can be located for instance to the right, to the left, or below the orifice 212 of the biopsy micropipette 200, and the rotation of the blastocyst 202 and associated movement of the target TE cells 224 would be such that the target TE cells 224 end up being substantially entirely covered by the area defined by the orifice 212 of the biopsy micropipette 200 at the three o'clock position of the blastocyst 202. For instance, when the target TE cells 224 are located to the left of the orifice 212 of the biopsy micropipette 200 when the biopsy micropipette 200 is at the 3 o'clock position, the blastocyst 202 can be rotated about the z axis to the right, and vice versa, and when the target TE cells are located below the orifice 212 of the biopsy micropipette 200 still when the biopsy micropipette 200 is at the 3 o'clock position, the blastocyst 202 can be rotated counterclockwise, to move the target TE cells 224 upwardly, and vice versa.

In other implementations, size variations among the target TE cells may result in the target TE cells being not substantially entirely covered by the orifice of the biopsy micropipette after rotation of the blastocyst, as shown for instance in FIG. 10(*c*). FIG. 10(*c*) illustrates five target TE cells 226 being almost entirely covered by the area defined by the orifice 212 of the biopsy micropipette 200, but one or more portions of certain target TE cells 224 can remain outside of the area defined by the orifice 212 of the biopsy micropipette 200. In such implementations, a small negative pressure, for instance in the range of between about −200 Pa and about −500 Pa, can be applied to the orifice 212 of the biopsy micropipette 200 to slightly aspirate the target TE cells 224 into the orifice 212 of the biopsy micropipette 200 and deform the target TE cells 224. Following such deformation, all the target TE cells 224 are then substantially entirely covered by the area defined by the orifice 212 of the biopsy micropipette 200, as shown in FIG. 10(*d*) and FIG. 10(*e*).

Following the alignment of the target TE cells 224 within the area defined by the orifice 212 of the biopsy micropipette 200, the method can include penetrating the ZP 210. To firmly hold the blastocyst 202 during biopsy, a negative pressure applied to the tip of the holding micropipette 300 by a pneumatic or hydraulic pump can be increased, for example, from between about −300 Pa and about −600 Pa to between about −1000 and −1500 Pa. A breach can be created in the ZP 210 at the three o'clock position of the blastocyst 202, for instance by laser pulses or a mechanical force. In some implementations, the size of the breach can correspond to the diameter of the orifice 212 of the biopsy micropipette 200, or be larger than the diameter of the orifice 212 of the biopsy micropipette 200. For example, if the diameter of the orifice of the biopsy micropipette is about 30 μm, the size of the breach created in the ZP can be between about 30 and about 35 μm. In some implementations, applying laser pulses or a mechanical force to the TE cell layer while creating the breach in the ZP can be omitted, which in turn can avoid the collapse of the blastocyst cavity.

In some implementations, the method can further include separating the target TE cells 224 from the blastocyst 202. After penetrating the ZP 210, the biopsy micropipette 200 can be inserted through the breach in the ZP 210 to reach the predetermined number of TE cells, or target TE cells 224. A small negative pressure, for instance −200 Pa, can be generated by a pneumatic or hydraulic pump and applied to the orifice 212 biopsy micropipette 200 to ensure appropriate contact between the TE cell layer and the orifice 212 of the biopsy micropipette 200. The biopsy micropipette 200 can then be forwarded along its longitudinal axis. In some implementations, the forwarding distance can be more than the radius of the blastocyst and less than the diameter of the blastocyst. After forwarding the biopsy micropipette 200, the angles $\beta_1$ and $\beta_2$ between the TE cell layer and the longitudinal axis of the biopsy micropipette 200 can become less than 90°, as shown in FIG. 11(*b*). Subsequently, a continuous vibration can be generated on the biopsy micropipette 200 to separate the target TE cells 224 from the blastocyst 202. The direction of the continuous vibration on the biopsy micropipette 200 can be along the longitudinal axis of the biopsy micropipette 200. After separating the target TE cells 224, the biopsy micropipette 200 can be retracted along its longitudinal axis and stopped outside the ZP 210 of the blastocyst 202. The pressure applied to the orifice 212 of the biopsy micropipette 200 can then be adjusted so as to position the collected TE cells near the orifice 212 of the biopsy micropipette 200.

Referring more specifically to FIGS. 11(*a*)-11(*b*), schematic representations illustrating forces analysis on the TE cells inside the biopsy micropipette in accordance to (a) a conventional biopsy method and (b) an embodiments of the method as described herein are shown. When separating target TE cells from the TE cell layer by a vibrating biopsy micropipette 200, four forces can be applied to the TE cells 206 in proximity of the orifice of the biopsy micropipette:

$F_{TE}$: traction force from adjacent TE cells located outside the biopsy micropipette;

$F_{AS}$: aspiration force from the biopsy micropipette;

$F_{IP}$: force induced by the inner pressure of the blastocyst cavity, and $F_P$: force exerted by the orifice of the biopsy micropipette.

$F_P$ is the main force involved in penetrating the TE cell layer and separating the target TE cells from the blastocyst. As $F_P$ increases, the capability of TE cell separation increases. Assuming that $F_{TE}$, $F_{AS}$ and $F_{IP}$ are maintained constant, as the angles $\alpha_1$, $\alpha_2$, $\beta_1$ and $\beta_2$ between the TE cell layer and the longitudinal axis of the biopsy micropipette decreases, $F_P$ increases. For example, when $\alpha_1$ is larger than 90°, i.e., when $\alpha_1$ forms an obtuse angle, the corresponding $F_{P1}$ is smaller than $F_{P2}$, whose $\beta_1$ angle is smaller than 90°, i.e., forms an acute angle, as shown in FIG. 11(*a*). To increase $F_{P1}$ with an obtuse angle $\alpha_1$, increasing the aspiration force $F_{AS}$ can be a potential option. However, a large $F_{AS}$ can result in the collapse of the blastocyst cavity occurring before the start of the TE cell separation. Once the blastocyst cavity collapses, $F_{IP}$ can be reduced significantly due to the inner pressure release, which can cause the TE cell layer to deform at the orifice of the biopsy micropipette and can increase its tendency to contract. In addition, the unbalanced force due to the decreasing $F_{IP}$ and the deformation of the TE cell layer at the orifice of the biopsy micropipette can change the position on the TE cell layer for target TE cell separation, which can impair the controlling of the number of collected intact TE cells. Furthermore, after the blastocyst cavity collapses, TE cell junctions can become undetectable, which is undesirable.

Referring to FIG. 11(*b*), when performing the collecting method described herein, the negative pressure applied to the orifice of the biopsy micropipette 200 can be less than about −500 Pa to avoid the collapse of the blastocyst cavity. To ensure that intact target TE cells can be collected, it has been found that angles between the TE cell layer and the axis of the biopsy micropipette 200 can become less than 90° during TE cell separation, as illustrated in FIG. 11(*b*).

Figure 12:
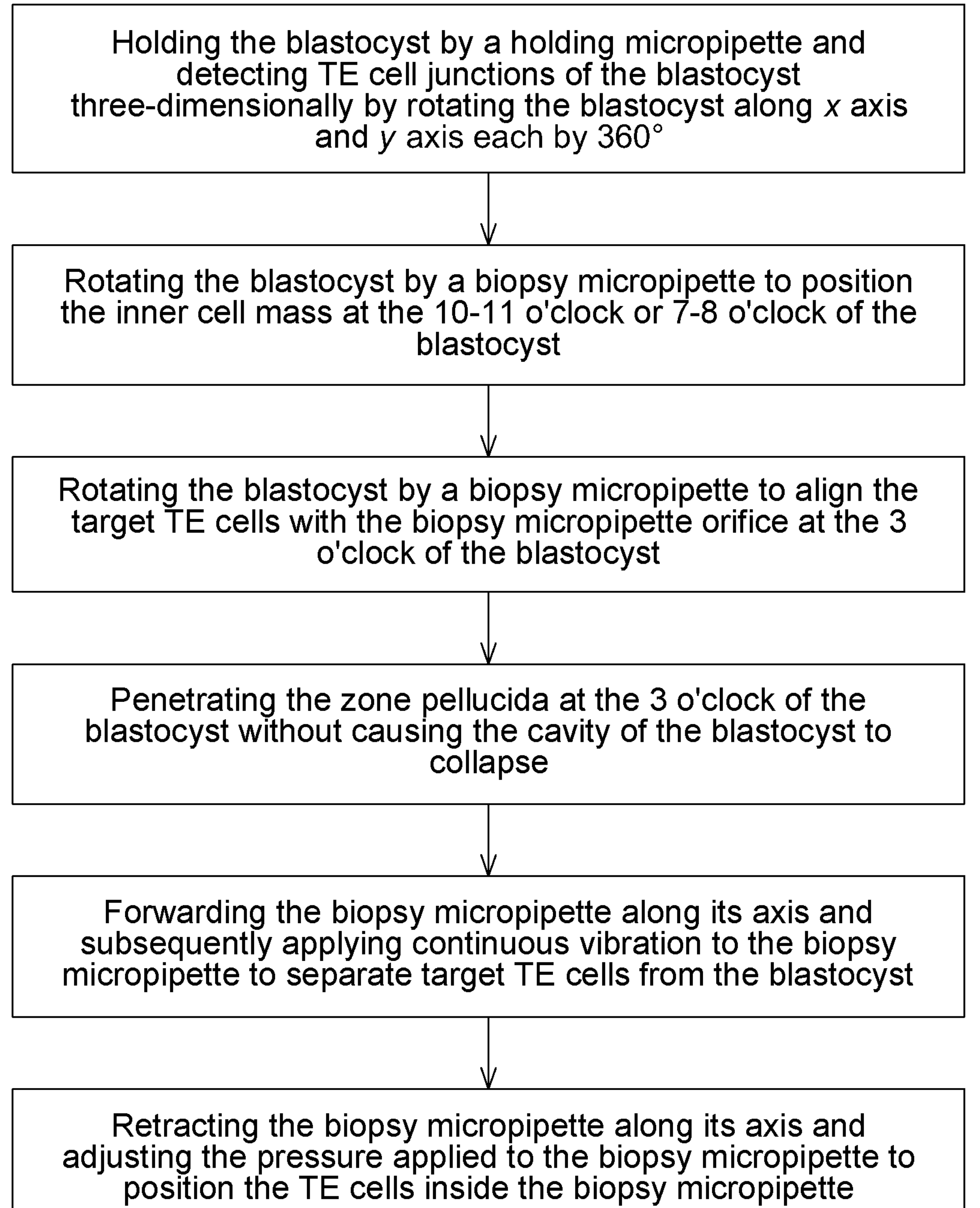
FIG. 12 is a block diagram depicting various steps of a method for collecting TE cells in accordance with an implementation.

An implementation of the method described above for collecting a predetermined number of intact target TE cells from a mouse blastocyst is provided in FIG. 12. The method includes holding the blastocyst, using for instance a holding micropipette, in the field of view of a microscope configured to image the blastocyst. The pressure applied to the holding micropipette can be for example between about −300 Pa and about −600 Pa. The microscopic focal plane can be adjusted along the z axis until the TE cell junctions at the bottom of the blastocyst can be identified. The blastocyst can be rotated, for instance using a biopsy micropipette, along the x axis and the y axis each by 360°, and an image of the blastocyst can be captured every forty-five degrees of rotation. Image matching between the set of partially overlapping captured images can be performed, for instance by using a SURF algorithm, to calculate the transformation matrix between 2D coordinates in the captured images and 3D coordinates on the TE cell layer.

TE cell junctions can be detected two-dimensionally by identifying bright and dark edges in the captured images or a texture map of the TE cell layer, then constructed three dimensionally by transforming the two-dimensional cell junctions in the captured images into the corresponding three-dimensional coordinates using the transformation matrix. The biopsy micropipette can then be used to rotate the blastocyst and position the ICM of the blastocyst between the ten o'clock position and the eleven o'clock position of the blastocyst, or between the seven o'clock position and the eight o'clock position of the blastocyst. The biopsy micropipette can be used to align the predetermined number of target TE cells within the orifice of the biopsy micropipette positioned at the three o'clock position of the blastocyst. The pressure applied to the holding micropipette can be increased from between −300 Pa and −600 Pa to between −1000 Pa and −1500 Pa. A breach can be created in the ZP at the three o'clock position of the blastocyst using laser pulses or a mechanical force without causing the cavity of the blastocyst to collapse. The biopsy micropipette can subsequently be inserted through the breach in the ZP to reach the target TE cells. A negative pressure ranging between about −500 Pa to −200 Pa can be applied to the orifice of the biopsy micropipette. The biopsy micropipette can be fast forwarded by more than the radius of the blastocyst and less than the diameter of the blastocyst along the x axis, for instance within less than about 5 seconds, less than about 2 seconds, or less than about 1 second. In some implementations, the biopsy micropipette can be fast forwarded by less than the radius of the blastocyst. Subsequently, continuous vibrations having a frequency of between about 50 Hz and about 5000 Hz, and for instance, a frequency of between about 50 and about 100 Hz, can be applied to the biopsy micropipette to separate the predetermined number of target TE cells from the blastocyst. The biopsy micropipette can then be retracted along the x axis and stopped outside the ZP of the blastocyst. The pressure applied to the orifice of the biopsy micropipette can be adjusted to retain the collected TE cells near the orifice of the biopsy micropipette.

Image Construction of Transparent Biological Structures Such as a Blastocyst Having TE Cell Junctions More details regarding image constructions of transparent biological structures will now be provided, with reference to a blastocyst as an example of a transparent biological structure.

As mentioned above, a blastocyst includes TE cells that are connected by cell junctions and that together form a cavity (e.g., substantially spherical cavity). To detect TE cell junctions three dimensionally, a 3D model can be built by projecting TE cell junctions detected in captured images on a surface (e.g., a spherical surface).

In the present method, image matching is used to match corresponding points from correlated texture in captured images, and calculate the transformation matrix between the two-dimensional coordinates in the captured images and three-dimensional real-world coordinates. The performance of techniques using image matching relies on texture richness on the surface of the analyzed structure, and does not rely on height variations on the surface of the structure being analyzed, as is the case with silhouette-based 3D construction techniques.

Figure 13:
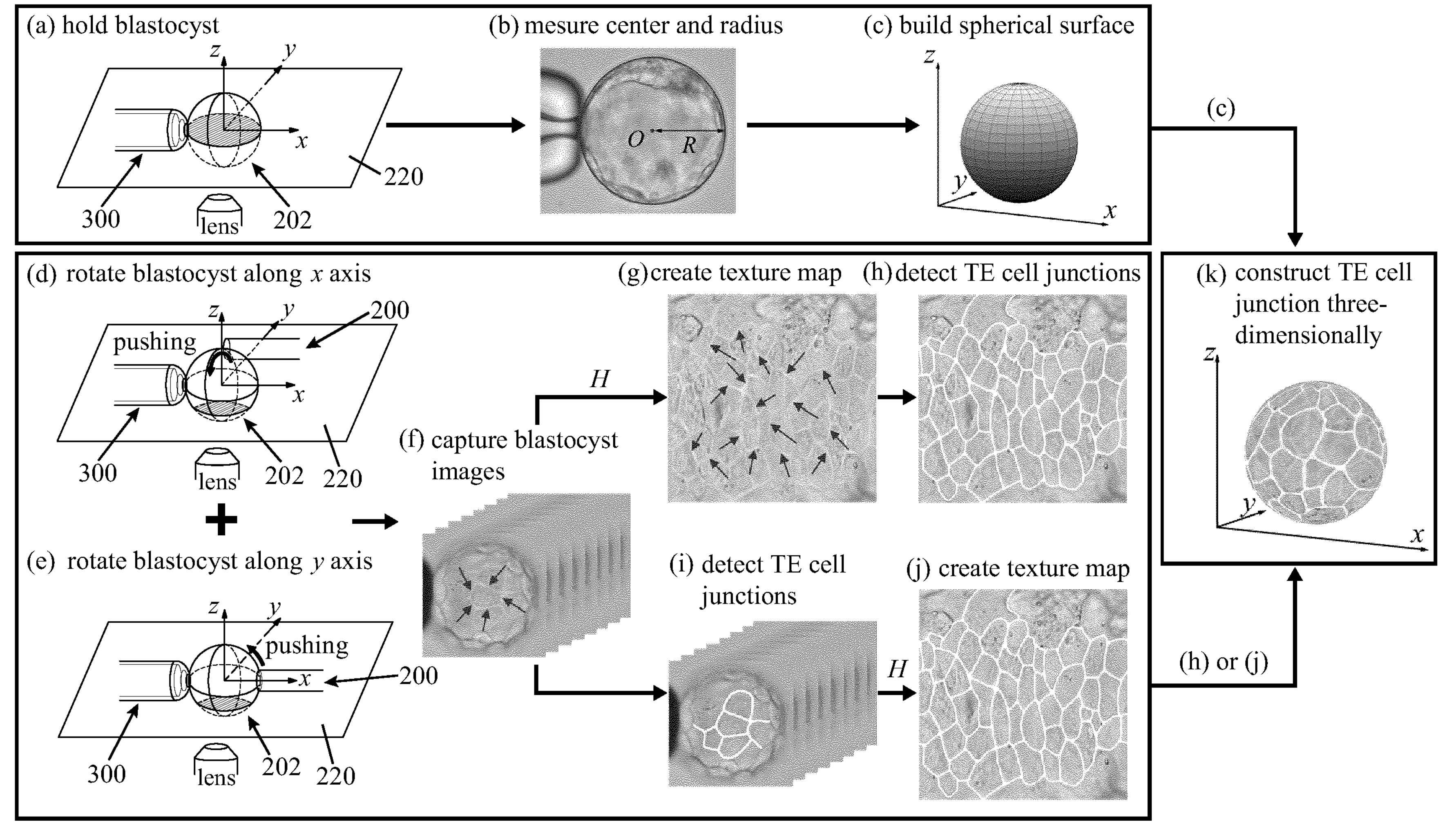
FIGS. 13(*a*)-(*k*) are schematic representations of various steps of a method for performing three-dimensional image construction of a blastocyst and detecting TE cell junctions of the blastocyst in accordance with another implementation.

Referring to FIG. 13, in some implementations, the method can include adjusting a depth of field of a microscopic system, the depth of field corresponding to less than the radius of the blastocyst 202, in an example, less than about 5 micrometers, to capture a series of images of the blastocyst 202 being analyzed. As the blastocyst 202 is being held in position, for instance by a holding micropipette 300, the microscopic focal plane 220 can be first adjusted until the outer edge of the ZP is in focus, which indicates that the focal plane 220 is located in the middle of the blastocyst 202 along the z axis. The center (O) and radius (R) of the circular area formed by the TE cell layer in the image can then be measured. A spherical surface Ω having the center O and radius R can be modeled as corresponding to the surface of the TE cell layer. The modeled spherical surface can be used to provide a 3D model representation of the outer surface of the blastocyst 202 for use in the cell junction 3D image construction. In other embodiments, the 3D model representation of the outer surface of the blastocyst need not be provided based on image data of the blastocyst itself.

Next, the method can include adjusting the focal plane 220 to view a portion of the biological structure, exemplified as the blastocyst 202 in FIG. 13, that is closest to the objective (i.e., the bottom portion of the blastocyst if the objective is below the blastocyst, as depicted in FIG. 13, which is representative of an inverted microscopy implementation) to capture a series of images of the blastocyst being analyzed. The depth of field may be significantly smaller than the blastocyst, for example, smaller than 5 μm, to form a thin imaging sheet at the bottom TE cell layer. According to this scenario, only the structures that move/rotate into this imaging sheet are imaged, and the interference resulting from the structures located above the imaging sheet, such as the structures in the middle or top part of the blastocyst, are minimized or at least reduced.

A biopsy micropipette 200 can be used to rotate the blastocyst 202 through a set of orientations, wherein each orientation corresponds to a different region of the TE cell layer being viewed, and wherein each region overlaps partly with at least another adjacent region. For example, the blastocyst 202 may be rotated both about the x axis and about the y axis each by 360° (or less, as the case may be). The method can include capturing, at each orientation, a respective image of the corresponding cell layer region, thereby obtaining a set of partially overlapping cell layer images. In some implementations, an image of the blastocyst can be captured every forty-five degrees or less of rotation to ensure a sufficient overlap between two consecutively captured images for image matching. Other image acquisition schemes are possible in other embodiments.

Image matching algorithms can be performed on the set of captured images of the blastocyst to calculate the transformation matrix (H) between each two captured images and 3D real-word coordinates. Image blending algorithms, such as feathering image blending, gradient domain and image pyramid blending, can be used to stitch or blend the captured images together to create a cell layer map (as used herein, the expression "cell layer map" can be used interchangeably with the expressions "texture map" or "cell layer texture map") according to the transformation matrix (H) between each two captured images, as shown in FIG. 13(*g*).

TE cell junctions can be detected either in the texture map or in the set of captured images, by identifying bright and dark edges (or other appropriate features), as illustrated in FIGS. 13(*g*) and 13(*h*), and in FIGS. 13(*f*) and 13(*i*), respectively. Examples of TE cell junctions are given by the arrows in FIGS. 13(*g*) and 13(*f*), and the detected TE cell junctions are labelled by white lines in FIGS. 13(*h*) and 13(*i*). In some implementations, the two-dimensional detection of the TE cell junctions in the texture map or in the set of captured images can be achieved by manual labeling, semi-automatic and/or automatic edge detection, as discussed above.

In some implementations, the TE cell junctions can be detected in both the texture map and in the set of captured images. For instance, in some implementations, the TE cell junctions can be detected in the set of captured images, the texture map can be created, and the TE cell junctions can be detected again on the texture map, for instance to confirm the information initially collected on the captured images regarding the TE cell junctions. In other implementations, the texture map can be created and the TE cell junctions can be detected on the texture map, and the TE cell junctions can also be detected on the captured images.

TE cell junctions can then be constructed three dimensionally by projecting the TE cell junctions from the texture map on the spherical surface Ω using projection algorithms, such as orthographic projection and perspective projection.

FIG. 13 illustrates an example of a schematic diagram showing a method for detecting TE cell junctions of a blastocyst three-dimensionally in accordance with one embodiment. In FIG. 13, image construction can be performed as follows: (a) A blastocyst can be gently held by a holding micropipette; (b) the center (O) and radius (R) of the circular area (shown as dark edge circle) formed by the TE cell layer can be measured; (c) a spherical surface with a center of O and a radius of R can be built as the surface of the TE cell layer, and a biopsy micropipette can be used to rotate the blastocyst along the (d) x axis and the (e) y axis each by 360°; (f) an image of the blastocyst can be captured every forty-five degrees or less of rotation; (g) a texture map can be created according to the transformation matrix (H) between each two images; (h) TE cell junctions can be detected in the texture map two-dimensionally by identifying the bright and dark edges (examples of TE cell junctions are given by arrows, and the detected TE cell junctions are labelled by white lines); (i) TE cell junctions can be detected in the set of captured images two-dimensionally by identifying the bright and dark edges (examples of TE cell junctions are given by arrows, and the detected TE cell junctions are labelled by white lines); (j) a texture map can be created according to the transformation matrix (H) between each two images; and (k) TE cell junctions can be constructed three-dimensionally by projecting the cell junctions from the texture map on the spherical surface.

Given that the TE cell layer is transparent/translucent, the structures on different surfaces can interfere with each other, and TE cell junctions, which present as a form of texture on the blastocyst surface, can be unclear due to TE cell junction transparency. The blurry texture can cause errors or even failure when performing image matching algorithms.

In order to overcome these challenges, the method can include steps to enhance the performance of the image matching and stitching operation. In some implementations, the set of partially overlapping cell layer images can be captured using a contrast-enhancing imaging technique. Non-limiting examples of contrast-enhancing image techniques suitable for use in imaging biological structures include, to name a few, phase contrast imaging and differential interference contrast (DIC). However, phase contrast and DIC can have some drawbacks, such as inherently leading to inhomogeneous image intensity, which can result in errors in the image matching. In such a case, image pre-processing steps may be performed before performing image matching. Non-limiting examples of image pre-processing steps can include intensity inhomogeneity correction methods such as energy minimization and Hilbert transform.

Another challenge that can be associated with the method for detecting and 3D imaging of cell junctions on a cell layer of a biological structure can be errors in the calculation of the transformation matrix (H) that can arise from directly performing image matching algorithms. An example of a source of potential errors in the calculation of the transformation matrix (H) can be when two or more captured cell layer images have different degrees of distortion for a same texture, which can result from the rotation of the biological structure through a set of orientations that occurs between the capturing, at each orientation, of a respective image of a corresponding cell layer region. In other words, given that the same texture presented in two captured cell layer images can show different degrees of distortion as a result of the 3D rotation manipulation between the capture of two cell layer images, directly performing image matching algorithms can cause errors or even failure in the calculation of transformation matrix (H).

In order to address this challenge and as mentioned above, the method can include steps to enhance the performance of the image matching and stitching operation, i.e., image pre-processing steps. In some implementations, such steps can include:

- simulating a group of 2D images for each cell layer image, or for at least one cell layer image, in a set of partially overlapping cell layer images to obtain simulated 2D cell layer images, which in turn can include:
  - projecting the cell layer image onto a virtual spherical surface Ω;
  - rotating the cell layer image three-dimensionally along the virtual spherical surface to obtain a group of 3D images;
  - projecting the group of 3D images back to 2D images to produce the group of simulated 2D cell layer images.

Rotating the cell layer image three-dimensionally can include rotating the at least one cell layer image by an angular interval ranging from about 5° to about 45° about each of two orthogonal axes. In addition, the cell layer image can be rotated by a step angle ranging from about 1° to about 5° between obtaining successive ones of the 3D images.

Projecting the group of 3D images back to 2D images to produce the group of simulated 2D cell layer images can be done using projection algorithms, such as orthographic projection and perspective projection.

In such implementations, the group of 2D images simulated by virtual 3D rotation, i.e., the simulated 2D cell layer images, can mimic the distortion of the texture on the corresponding cell layer image that can result from the 3D rotation manipulation occurring between the capture of two cell layer images. In turn, performing an image matching and stitching operation using the groups of simulated 2D cell layer images, instead of non-simulated captured cell layer images, can contribute to improving the accuracy of the transformation matrix (H) and avoiding matching failure.

In some implementations, further imaging processing steps may be performed. Non-limiting examples of images processing steps can include blur detection algorithms, such as Laplace transform and wavelet transform. Performing blur detection algorithms can be beneficial to detect and remove blurry texture in captured images that can result from image construction of translucent structures. For instance, when imaging a spherical TE cell layer under a depth of field that is less than 5 micrometers, part of the TE cell layer beyond the focal plane can create a blurry texture in the captured images. The blurry texture in the captured images can add noise and can blur part of the 2D texture map (or cell layer map). As a result, some artificial TE cell junctions can be added in the 2D texture map or some TE cell junctions can be lost in the 2D texture map. As mentioned above, blur detection algorithms can be implemented to detect and delete blurry areas in each captured image, and the resulting processed images can be used to more accurately create the texture map.

Examples of image matching methods that can be used can include algorithms such as scale-invariant feature transform (SIFT), speeded-up robust features (SURF) and oriented FAST and rotated BRIEF (ORB). Software tools such as Autodesk123D, Regard3D and VisualSFM can be used to calculate the transformation matrix between each two captured images.

Figure 14:
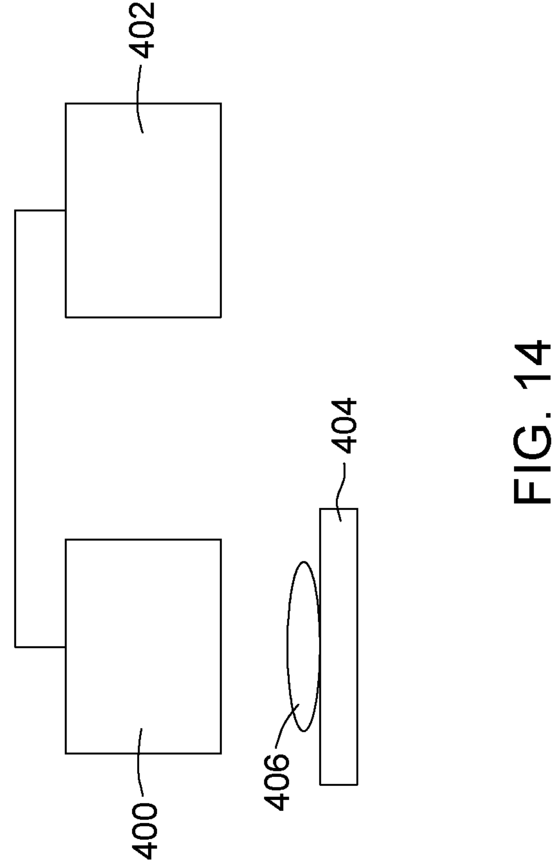
FIG. 14 is a schematic representation of a system that includes a microscope, a control and processing unit, and a sample holder and positioner.

With reference to FIG. 14, it is appreciated that the embodiments disclosed herein may also include a control and processing unit 402 configured for controlling, monitoring, and/or coordinating the functions and operations of various system components, including the microscope 400 and a sample holder and positioner 404 configured for holding and positioning a biological structure 406. The control and processing unit generally includes one or more processors and one or more memories. The control and processing unit can be implemented in hardware, software, firmware, or any combination thereof, and be connected to various hardware components via wired and/or wireless communication links to send and/or receive various types of signals, such as timing and control signals, measurement signals, and data signals. The control and processing unit may be controlled by direct user input and/or by programmed instructions, and may include an operating system for controlling and managing various functions of the imaging system. Depending on the application, the control and processing unit may be fully or partly integrated with, or physically separate from, the other hardware components of the imaging system. In addition, the embodiments of the imaging system disclosed herein may also include one or more user interface devices operatively connected to the control and processing unit to allow the input of commands and queries to the imaging system, as well as present the outcomes of the commands and queries.

Several alternative implementations and examples have been described and illustrated herein. The implementations of the technology described above are intended to be exemplary only. A person of ordinary skill in the art would appreciate the features of the individual implementations, and the possible combinations and variations of the components. A person of ordinary skill in the art would further appreciate that any of the implementations could be provided in any combination with the other implementations disclosed herein. It is understood that the technology can be embodied in other specific forms without departing from the central characteristics thereof. The present implementations and examples, therefore, are to be considered in all respects as illustrative and not restrictive, and the technology is not to be limited to the details given herein. Accordingly, while the specific implementations have been illustrated and described, numerous modifications come to mind.

The invention claimed is:

1. A method for detecting and 3D imaging of cell junctions on a cell layer of a biological structure, the method comprising:

rotating the biological structure through a set of orientations;

capturing, at each orientation, a respective image of a corresponding one of a set of cell layer regions of the cell layer, wherein each cell layer region partly overlaps with at least another cell layer region, thereby obtaining a set of partially overlapping cell layer images;

creating a cell layer texture map containing cell junction information from the set of cell layer images; and constructing a 3D image of the cell junctions based on the cell layer texture map and the cell junction information contained therein, wherein the set of partially overlapping cell layer images are pre-processed prior to performing an image matching and stitching operation, wherein pre-processing the set of partially overlapping cell layer images comprises:

obtaining a group of simulated 2D images for at least one cell layer image of the set of partially overlapping cell layer images; and performing the image matching and stitching operation using the group of simulated 2D images; and wherein obtaining the group of simulated 2D images comprises:

projecting the at least one cell layer image onto a virtual spherical surface;

rotating the at least one cell layer image three-dimensionally along the virtual spherical surface to obtain a group of 3D images; and projecting the group 3D images back to 2D images to produce the group of simulated 2D cell layer images.

2. The method of claim 1, wherein creating the cell layer texture map comprises detecting the cell junction information from the set of cell layer images, and performing the image matching and stitching operation based on the set of cell layer images to create the cell layer texture map, wherein the cell layer texture map incorporates therein the cell junction information detected from the set of cell layer.

3. The method of claim 1, wherein creating the cell layer texture map comprises performing the image matching and stitching operation based on the set of cell layer images to create the cell layer texture map, and detecting the cell junction information from the cell layer texture map.

4. The method of claim 1, wherein constructing the 3D image of the cell junctions comprises projecting the cell junction information onto a 3D model representation of an outer surface of the biological structure.

5. The method of claim 4, further comprising determining the 3D model representation of the outer surface of the biological structure based on previously acquired image data of the biological structure.

6. The method of claim 5, wherein determining the 3D model representation of the outer surface of the biological structure comprises:

capturing an image of the biological structure;

determining, as the previously acquired image data, a radius and a position of a center of the biological structure in the captured image; and modeling, based on the previously acquired image data, the 3D model representation of the outer surface of the biological structure.

7. The method of claim 1, wherein detecting the cell junction information comprises identifying bright and dark edges via manual labeling, semi-automatic edge detection, automatic edge detection, or any combination thereof.

8. The method of claim 1, wherein rotating the biological structure through the set of orientations comprises:

rotating the biological structure about a first axis of rotation to cover a first subset of the orientations; and rotating the biological structure about a second axis of rotation to cover a second subset of the orientations, wherein the first axis of rotation and the second axis of rotation are perpendicular to each other.

* * * * *